(12) United States Patent
Chikama et al.

(10) Patent No.: US 11,385,488 B2
(45) Date of Patent: Jul. 12, 2022

(54) CURVED DISPLAY PANEL

(71) Applicant: SHARP KABUSHIKI KAISHA, Sakai (JP)

(72) Inventors: Yoshimasa Chikama, Sakai (JP); Masamitsu Yamanaka, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/351,726

(22) Filed: Jun. 18, 2021

(65) Prior Publication Data

US 2021/0397038 A1 Dec. 23, 2021

Related U.S. Application Data

(60) Provisional application No. 63/042,167, filed on Jun. 22, 2020.

(51) Int. Cl.
| | |
|---|---|
| *G02F 1/1333* | (2006.01) |
| *G02F 1/1335* | (2006.01) |
| *G02F 1/1343* | (2006.01) |
| *G02F 1/1339* | (2006.01) |

(52) U.S. Cl.
CPC ...... *G02F 1/133354* (2021.01); *G02F 1/1339* (2013.01); *G02F 1/133512* (2013.01); *G02F 1/133514* (2013.01); *G02F 1/134336* (2013.01); *G02F 2201/56* (2013.01)

(58) Field of Classification Search
None
See application file for complete search history.

(56) References Cited

U.S. PATENT DOCUMENTS

| | | | | |
|---|---|---|---|---|
| 2009/0161048 | A1* | 6/2009 | Satake | G02F 1/133305 349/110 |
| 2016/0274420 | A1* | 9/2016 | Oh | G02F 1/136286 |
| 2017/0192317 | A1* | 7/2017 | Song | G02F 1/13306 |
| 2018/0031906 | A1* | 2/2018 | Park | G02F 1/133512 |
| 2018/0157101 | A1 | 6/2018 | Wu | |
| 2018/0210277 | A1* | 7/2018 | Wang | G02F 1/133514 |
| 2019/0043894 | A1* | 2/2019 | Chung | H01L 27/1218 |

FOREIGN PATENT DOCUMENTS

JP 2018-526677 A 9/2018

* cited by examiner

*Primary Examiner* — Shan Liu
(74) *Attorney, Agent, or Firm* — ScienBiziP, P.C.

(57) ABSTRACT

A curved display panel including a display surface curving at least around a curve axis and displaying an image, the curved display panel includes a first substrate; a second substrate spaced apart from, and facing, the first substrate; a plurality of pixels provided to the first substrate, and arranged in a matrix inside the display surface; a light shield provided to the second substrate, extending in a curve direction of the display surface, and dividing the pixels adjacent to each other in an orthogonal-to-curve direction extending along the display surface and orthogonal to the curve direction; and an indicator provided to the second substrate, and serving as a position indicator of each of the pixels in the curve direction.

8 Claims, 21 Drawing Sheets

CURVED DISPLAY PANEL

CROSS-REFERENCE TO RELATED APPLICATION

The present application claims priority from Provisional Application No. 63/042,167, the content to which is hereby incorporated by reference into this application.

BACKGROUND

1. Field

A technique disclosed in this specification relates to a curved display panel.

2. Description of the Related Art

Japanese Unexamined Patent Application Publication (Translation of PCT Application) No. 2018-526677 describes an example of a curved display panel conventionally known in the art. The curved display panel described in Japanese Unexamined Patent Application Publication (Translation of PCT Application) No. 2018-526677 includes a color filter substrate. The color filter substrate includes a first light-shielding region provided to correspond to gate lines and data lines of an array substrate, and further includes a second light-shielding region provided to correspond to a center axis of a sub-pixel region in the array substrate. The second light-shielding region has a width greater than the center axis of the sub-pixel region.

In the curved display panel described in above Japanese Unexamined Patent Application Publication (Translation of PCT Application) No. 2018-526677, the second light-shielding region shields a black streak appearing on the center axis of the sub-pixel region to keep the black streak out of view. Meanwhile, not all of a plurality of pixels included in the curved display panel function normally. An example of possible defects is a bright dot defect in which a pixel is always recognized bright. It is technically highly difficult to repair the defective pixel to allow the pixel to appear dark.

SUMMARY

An aspect of a technique described in this specification is completed in view of the above problems, and is intended to correct a bright dot defect to appear dark.

(1) A curved display panel related to an aspect of a technique described in a specification of the present application includes a display surface curving at least around a curve axis and displaying an image. The curved display pane includes: a first substrate; a second substrate spaced apart from, and facing, the first substrate; a plurality of pixels provided to the first substrate, and arranged in a matrix inside the display surface; a light shield provided to the second substrate, extending in a curve direction of the display surface, and dividing the pixels adjacent to each other in an orthogonal-to-curve direction extending along the display surface and orthogonal to the curve direction; and an indicator provided to the second substrate, and serving as a position indicator of each of the pixels in the curve direction.

(2) In the above curved display panel according to the above item (1), the indicator may include a plurality of indicators aligned at intervals in the curve direction, and arranged so that positional relationship of the indicators with the pixels while the display surface is flat may vary in accordance with a position of the second substrate in the curve direction.

(3) In the above curved display panel according to the above item (2), in a center portion of the second substrate in the curve direction, the indicators may be arranged so that the positional relationship of the indicators with the pixels while the display surface is flat may coincide with positional relationship of the indicators with the pixels while the display surface is curved.

(4) The above curved display panel according to the above item (2) or (3) may further include a seal sandwiched between outer periphery ends of the first substrate and the second substrate. In an end portion of the second substrate in the curve direction, the indicators may be arranged so that the positional relationship of the indicators with the pixels while the display surface is flat may coincide with positional relationship of the indicators with the pixels while the display surface is curved.

(5) In the above curved display panel according to any one of the above items (2) to (4), in an intermediate portion of the second substrate in the curve direction between the center position and the end position, the indicators may be arranged so that the positional relationship of the indicators with the pixels while the display surface is flat may be different from positional relationship of the indicators with the pixels while the display surface is curved.

(6) In the above curved display panel according to the above item (5), the indicators may be arranged so that, in the intermediate portion of the second substrate, a difference between positions of the indicators in relation to the pixels in the curve direction while the display surface is flat and positions of the indicators in relation to the pixels in the curve direction while the display surface is curved may become smaller toward the center position in the curve direction.

(7) In the curved display panel according to any one of the above items (1) to (6), the indicator may be integrally provided to the light shield, and may protrude from the light shield in the orthogonal-to-curve direction.

(8) In the curved display panel according to the above item (7), the indicator may be provided to protrude in the orthogonal-to-curve direction from opposing sides of the light shield.

(9) In the above curved display panel according to any one of the above items (1) to (8), the indicator may include a plurality of indicators aligned at intervals in the curve direction, and individually provided to the pixels aligned in the curve direction.

(10) In the above curved display panel according to any one of the above items (1) to (9), each of the pixels may include: a plurality of pixel electrodes provided to the first substrate and arranged in a matrix inside the display surface, and a plurality of color filters provided to the first substrate and arranged to overlap the pixel electrodes. The color filters adjacent to each other in the curve direction may have different colors, and the color filters adjacent to each other in the orthogonal-to-curve direction may have the same color.

An aspect of a technique described in this specification can correct a bright dot defect to appropriately appear dark.

DETAILED DESCRIPTION

First Embodiment

Figure 1:
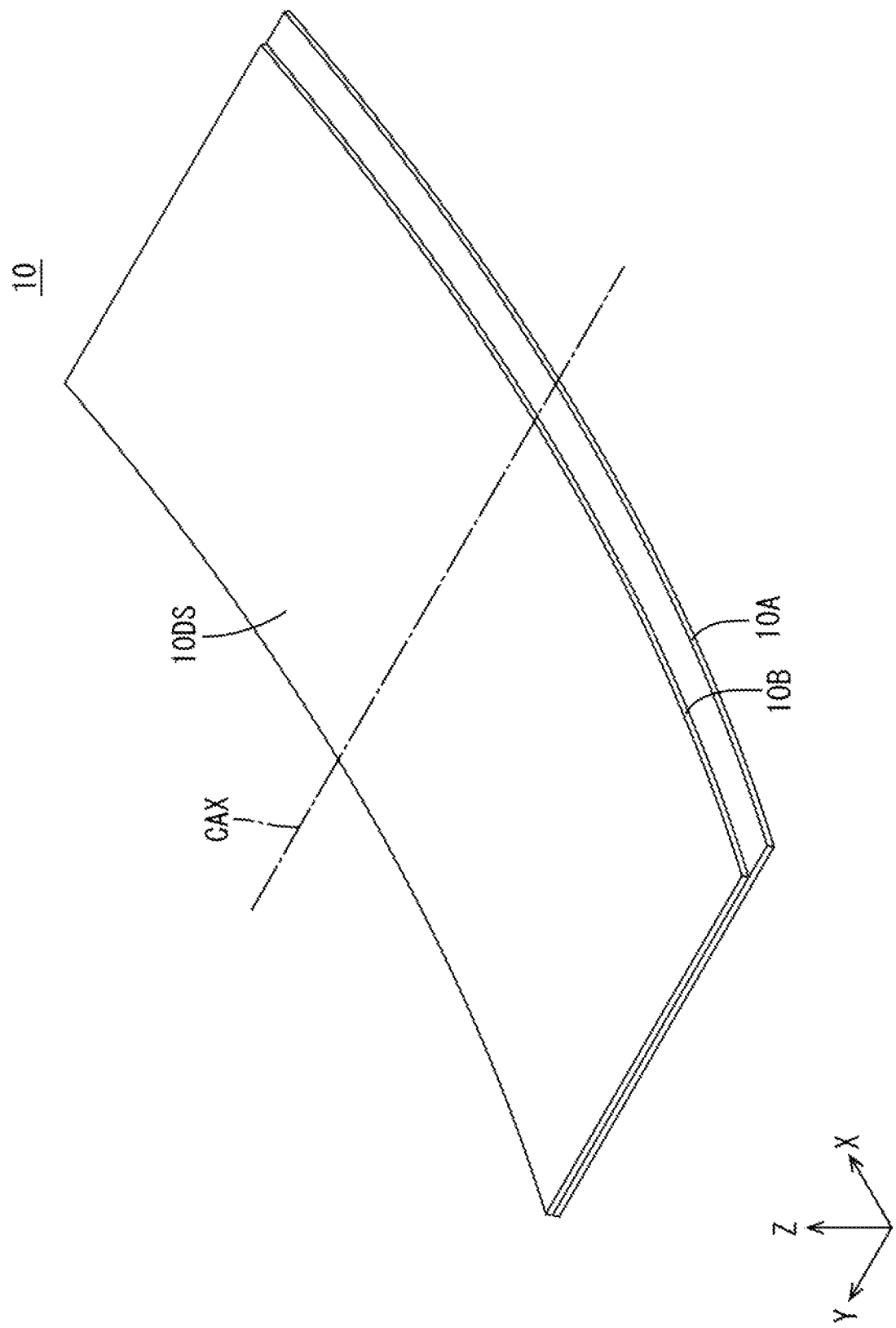
FIG. 1 is a schematic perspective view of a curved liquid crystal panel according to a first embodiment.

A first embodiment is described, with reference to FIGS. 1 to 18B. This embodiment shows an example of a curved liquid crystal panel (a curved display panel) 10 included in a liquid crystal display device and of a method for producing the curved liquid crystal panel 10. Note that the drawings include an X-axis, a Y-axis, and a Z-axis as a part thereof, and the directions of the axes are those indicated in the drawings. Moreover, vertical directions are indicated with reference to FIGS. 2 to 5, 15A, and 18B. The top and the bottom of these drawings respectively indicate the front and the back of the curved liquid crystal panel 10.

As illustrated in FIG. 1, the curved liquid crystal panel 10 includes a display surface 10DS curved and displaying an image. The curved display surface 10DS displays the image, using light emitted from a backlight apparatus (a lighting device) disposed outside. Together with such a unit as the backlight apparatus, the curved liquid crystal panel 10 is included in the liquid crystal display device. On the whole, the curved liquid crystal panel 10 is a horizontally oriented quadrangle (a rectangle, a longitudinal quadrangle). The curved liquid crystal panel 10 curves in a substantial arc to have a longitudinal center portion curving in toward the back and longitudinally opposing ends curving out toward the front. The curved liquid crystal panel 10 has a cross-section substantially C-shaped. The curved liquid crystal panel 10 has: a transverse side that coincides with the Y-axis direction of the drawings; a longitudinal side that coincides with the X-axis direction of the drawings; and a thickness (a normal direction to the display surface 10DS) that coincides with the Z-axis direction of the drawings. A curve direction of the curved liquid crystal panel 10, in which a curvature of the display surface 10DS varies, coincides with the longitudinal direction (the X-axis direction). An orthogonal-to-curve direction of the curved liquid crystal panel 10, which is orthogonal to the curve direction and extending along the display surface 10DS, coincides with the transverse direction (the Y-axis direction). The orthogonal-to-curve direction also coincides with a direction of a curve axis CAX. The display surface 10DS of the curved liquid crystal panel 10 is divided into: a display region positioned toward the center of the screen and displaying an image; and a non-display region positioned toward an outer peripheral end of the screen, shaped into a frame to surround the display region, and displaying no image. Note that the backlight apparatus is preferably shaped into, but not necessarily limited to, a curve in conformity with the curved liquid crystal panel 10.

Figure 2:
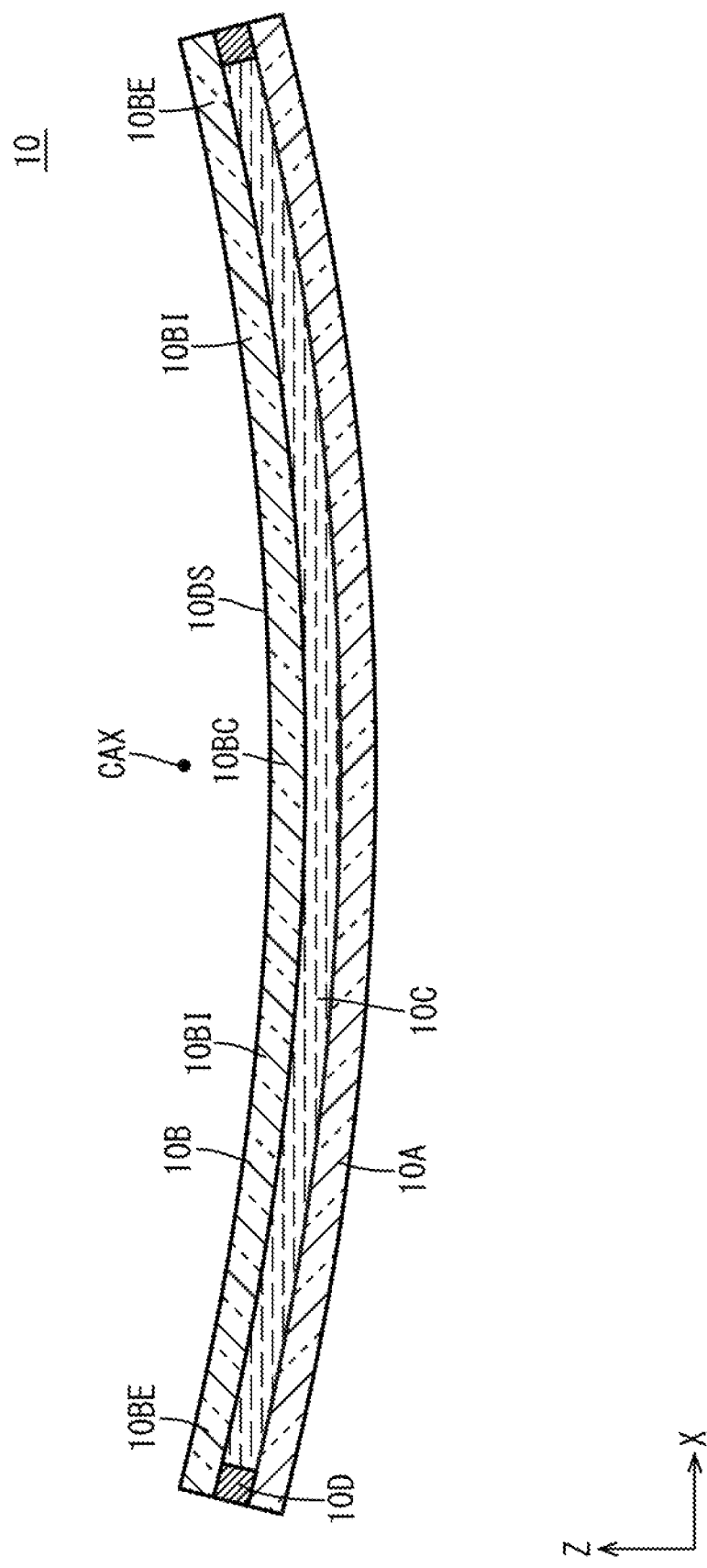
FIG. 2 is a schematic cross-sectional view of the curved liquid crystal panel.

As illustrated in FIG. 2, the curved liquid crystal panel 10 includes: an array substrate (a first substrate, or an active matrix substrate) 10A; a counter substrate (a second substrate) 10B spaced apart from, and facing, the array substrate 10A; an liquid crystal layer 10C sandwiched between both of the substrates 10A and 10B; and a seal 10D sandwiched between outer peripheral ends of the both of the substrates 10A and 10B. The liquid crystal layer 10C contains liquid crystal molecules; that is, a substance whose optical property varies upon application of an electric field. The seal 10D extends along the whole circumference of the outer peripheral ends of the both of the substrates 10A and 10B to encircle and seal the liquid crystal layer 10C. The seal 10D is shaped into a quadrangular frame (an endless ring) in plan view. Provided between the array substrate 10A and the counter substrate 10B is a cell gap as thick as the liquid crystal layer 10C. The cell gap is held with, for example, the seal 10D. The array substrate 10A and the counter substrate 10B each have a glass substrate that is almost invisible and excels in light-transparency. The glass substrate contains various kinds of films stacked on top of another. The counter substrate 10B is disposed toward the front (the front face) of the curved liquid crystal panel 10. The counter substrate 10B is smaller in transverse dimension than the array substrate 10A, and attached to the array substrate 10A so that a transverse end of the counter substrate 10B and a transverse end of the array substrate 10A coincide with each other. Hence, another transverse end of the array substrate 10A protrudes sideway with respect to the counter substrate 10B. Connected to the protrusion is a flexible substrate serving as a junction and connected to a signal supply source. The curve axis CAX of the curved liquid crystal panel 10 is disposed to the counter substrate 10B (across from the array substrate 10A) in the Z-axis direction. A polarizer plate is attached to each of outer faces of the both substrates 10A and 10B.

Figure 3:
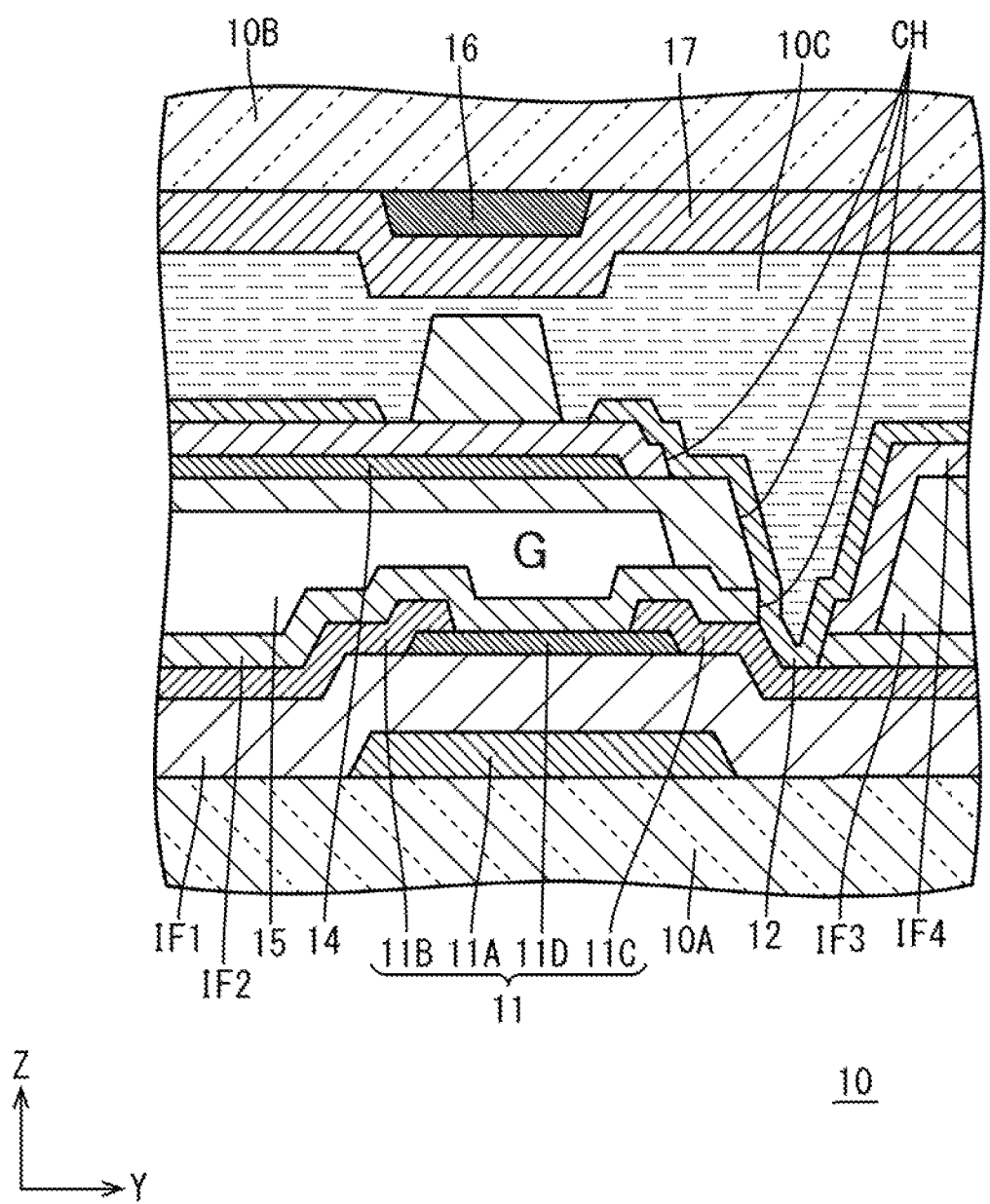
FIG. 3 is a cross-sectional view in the vicinity of a TFT included in the curved liquid crystal panel, the cross-sectional view being taken along a Y-axis.
Figure 4:
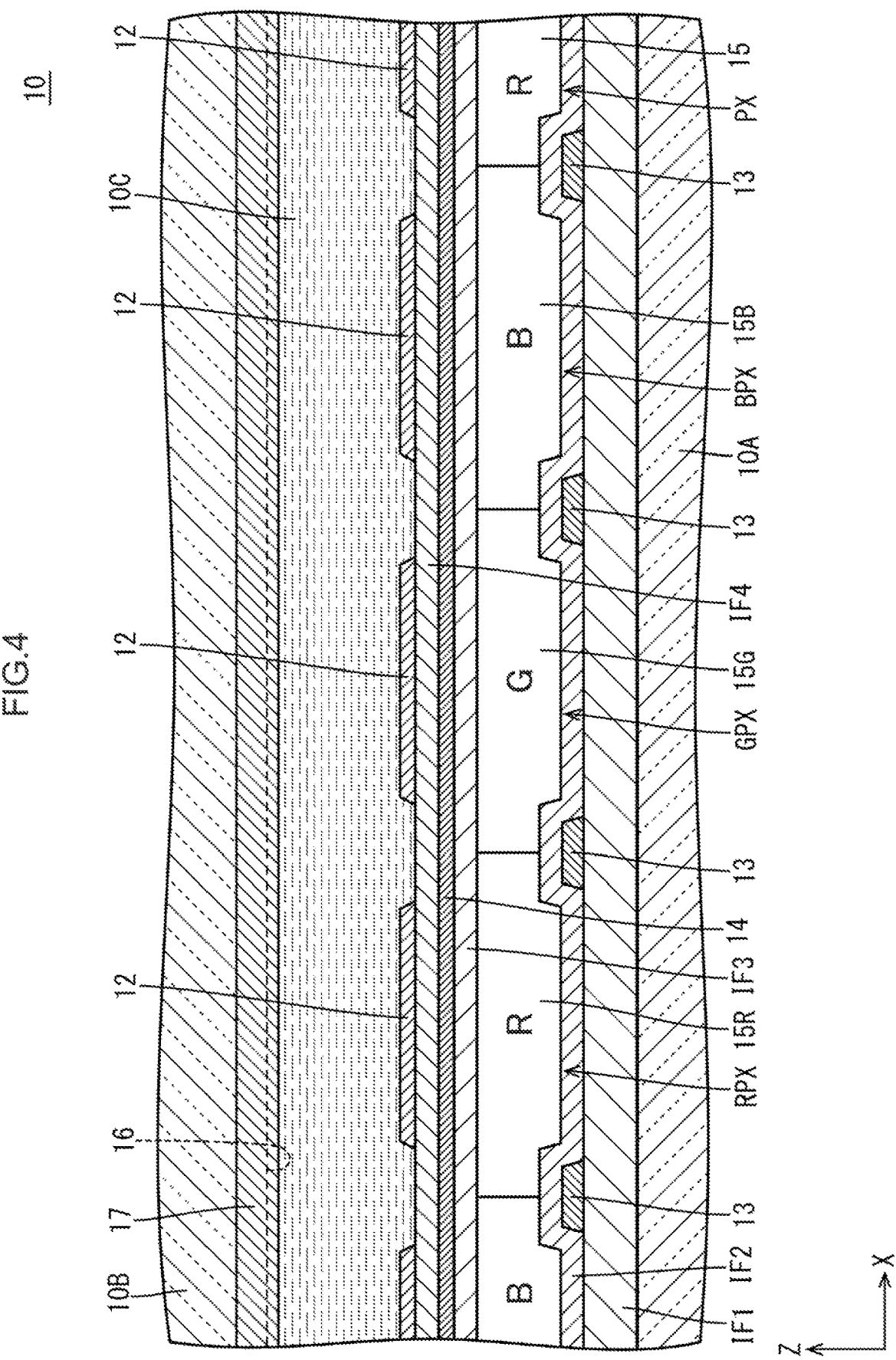
FIG. 4 is a cross-sectional view of a pixel included in the curved liquid crystal panel, the cross-sectional view being taken along an X-axis.

As illustrated in FIG. 2, the array substrate 10A is disposed toward the back (the back face) of the curved liquid crystal panel 10. As illustrated in FIG. 3, a plurality of thin film transistors (TFTs) 11 serving as switching elements and a plurality of pixel electrodes 12 are provided to an inner face of the array substrate 10A in the display region (toward the liquid crystal layer 10C and across from the counter substrate 10B). The TFTs 11 and the pixel electrodes 12 are arranged in the X-axis and the Y-axis directions in a matrix. Each of the pixel electrodes 12 is charged upon the driving of the TFTs 11 to have a potential in accordance with levels of gray to be displayed. As illustrated in FIGS. 3 and 4, a grid of gate wires (scanning wires) and source wires (data wires or image wires) 13 are arranged to surround the TFTs 11 and the pixel electrodes 12 on the array substrate. Each of the gate wires extends in the X-axis direction, and each of the source wires 13 extends in the Y-axis direction. Each TFT 11 includes: a gate electrode 11A connected to the gate wire; a source electrode 11B connected to the source wire 13; a drain electrode 11C connected to the pixel electrode 12; and a channel 11D disposed across, and above, a gate insulating film IF1 from the gate electrode 11A, and connected to the source electrode 11B and the drain electrode 11C. The gate electrode 11A is positioned below the gate insulating film IF1 and made of the same metal film as the gate wire is. The source electrode 11B and the drain electrode 11C are positioned above the gate insulating film IF1, and made of the same metal film as the source wire 13 is. Both of these metal films conduct electricity and shield light. The channel 11D is made of a semiconductor film.

As illustrated in FIGS. 3 and 4, the array substrate 10A includes: a first interlayer insulating film IF2 and a planarization film IF3 stacked above the source electrode 11B, the drain electrode 11C, and the channel 11D; and further includes a common electrode 14 stacked above the planarization film IF3. The common electrode 14 is provided inside the display surface 10DS, and monolithically extends at least all across a display region AA. The common electrode 14 is maintained to have a predetermined reference potential. The pixel electrode 12 is positioned across, and above, a second interlayer insulating film IF4 from the common electrode 14; that is, the pixel electrode 12 is positioned closer to the liquid crystal layer 10C. The pixel electrode 12 and the common electrode 14 are transparent electrode films positioned to vertically sandwich the second interlayer insulating film IF4. Both the pixel electrode 12 and the common electrode 14 conduct electricity and shield light. The pixel electrode 12 includes a plurality of slits each opening thereon. Each of the first interlayer insulating film IF2, the planarization film IF3, and the second interlayer insulating film IF4, which are sandwiched between the pixel electrode 12 and the drain electrode 11C to be connected to the pixel electrode 12, includes a contact hole CH to connect together both the pixel electrode 12 and the drain electrode 11C. When the pixel electrode 12 is charged, upon the driving of the TFT 11, to have a potential based on an image signal to be transmitted to the source wire 13, a potential difference is observed between the pixel electrode 12 and the common electrode 14. In a clearance between the common electrode 14 and an opening edge of the slit of the pixel electrode 12, a fringe field (an oblique electric filed) is observed. The fringe field contains a component normal to the display surface 10DS in addition to a component along the display surface 10DS. Hence, the use of the fringe field makes it possible to control orientations of the liquid crystal molecules contained in the liquid crystal layer 10C. In accordance with the orientations of the liquid crystal molecules, an image is displayed accordingly. That is, the curved liquid crystal panel 10 according this embodiment operates on a fringe field switching mode.

As illustrated in FIGS. 3 and 4, the array substrate 10A is provided with a color filter 15 between the first interlayer insulating film IF2 and the planarization film IF3. That is, the curved liquid crystal panel 10 according to this embodiment is of a color-filter-on-array (COA) structure. The color filter 15 and the pixel electrode 12 constitute a pixel PX, wherein the pixel electrode 12 is provided across, and above, the planarization film IF3, the common electrode 14, and the second interlayer insulating film IF4 from the color filter 15. The pixel PX includes a plurality of pixels PX arranged in the X-axis and the Y-axis directions in a matrix. Each color filter 15 contains a pigment depending on a color to be presented. The pigment absorbs a color not to be presented and selectively allows the color to be presented (light of a specific color) to pass through the filter 15. Of the color filters 15, those with different colors are repeatedly arranged in the X-axis direction; whereas, those with the same color are continuously arranged in the Y-axis direction. More specifically, the color filters 15 include those of three colors; namely, a red color filter (a red coloring portion) 15R presenting red; a green color filter (a green coloring portion) 15G presenting green; and a blue color filter (a blue coloring portion) 15B presenting blue. The red color filter 15R and a pixel electrode 12 overlapping the red color filter 15R constitute a red pixel RPX. The green color filter 15G and a pixel electrode 12 overlapping the green color filter 15G constitute a green pixel GPX. The blue color filter 15B and a pixel electrode 12 overlapping the blue color filter 15B constitute a blue pixel BPX. In this curved liquid crystal panel 10, the pixels RPX, GPX, and BPX in three colors adjacent to one another in the X-axis direction constitute a display pixel capable of presenting colors with predetermined levels of gray. This display pixel includes a plurality of display pixels arranged inside the display surface 10DS in the X-axis and Y-axis directions. Note that both the gate wires and the source wires 13 included in the array substrate 10A shield light. The gate wires extending in the X-axis direction divide the pixels PX adjacent to each other in the Y-axis direction, and the source wires extending in the Y-axis direction divide the pixels PX adjacent to each other in the X-axis direction. These light-shielding wires can block light traveling between the pixels PX adjacent to each other. Such a feature can appropriately maintain levels of gray to be displayed by each of the pixels PX.

Meanwhile, as illustrated in FIGS. 3 and 4, a light shield 16 is provided to an inner face of the counter substrate 10B in the display region (toward the liquid crystal layer 10C and across from the array substrate 10A). The light shield 16 divides the pixels PX arranged above the array substrate 10A and adjacent to each other in the Y-axis direction. The light shield 16 is made of a light-shielding material (such as carbon black) whose surface is colored black. The light shield 16, extending in the X-axis direction, is shaped into a strip having a nearly constant width. This light shield 16 can block light traveling between the pixels PX adjacent to each other in the Y-axis direction. Such a feature can appropriately maintain levels of gray to be displayed by each of the pixels PX. In plan view, the light shield 16 is disposed to overlap the gate wire included in the array substrate 10A. Furthermore, an overcoat film 17 is provided above the light shield 16 and to the inner face of the counter substrate 10B in the display region. The overcoat film 17 planarizes the inner face of the counter substrate 10B. Note that an alignment film is provided to an innermost face of each of the substrates 10A and 10B. The alignment film faces the liquid crystal layer 10C and aligns the liquid crystal molecules.

Figure 5:
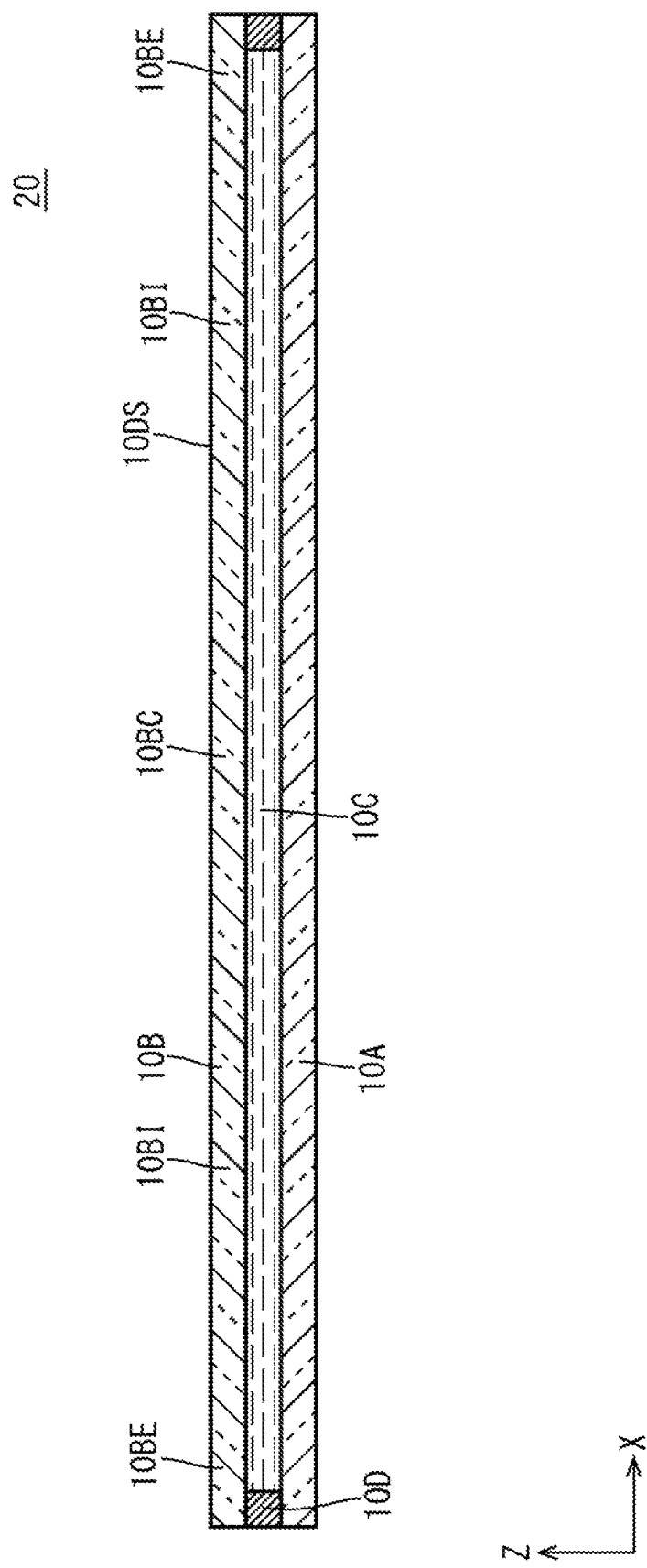
FIG. 5 is a schematic cross-sectional view of a flat liquid crystal panel.

The curved liquid crystal panel 10 according to this embodiment is produced as follows. That is, a method for producing the curved liquid crystal panel 10 includes at least: a flat liquid crystal panel production step (a flat display panel production step) for producing a flat liquid crystal panel (a flat display panel) 20 whose display surface 10DS is flat; and a flat liquid crystal panel reshaping step (a flat display panel reshaping step) for reshaping the flat liquid crystal panel 20 so that the display surface 10DS curves around the curve axis CAX. As illustrated in FIG. 5, the flat liquid crystal panel 20 is flat because a pair of the substrates 10A and 10B and the display surface 10DS do not curve. A clearance as thick as the liquid crystal layer 10C is allowed between the array substrate 10A and the counter substrate 10B included in the flat liquid crystal panel 20 to be reshaped in this flat liquid crystal panel reshaping step. Hence, in the flat liquid crystal panel reshaping step, substantially no relative displacement in the Y-axis direction; that is, along the curve axis CAX (in the orthogonal-to-curve direction), is observed among the constituent features included in the array substrate 10A and the counter substrate 10B; whereas, relative displacement in the X-axis direction; that is, in the curve direction in which the curvature of the display surface 10DS varies, is observed among the constituent features included in the array substrate 10A and the counter substrate 10B.

In this embodiment, as illustrated in FIGS. 3 and 4, both the pixel electrode 12 and the color filter 15 included in the pixel PX are provided to the array substrate 10A. Such a feature makes it possible to keep the pixel electrode 12 and the color filter 15 from relative displacement in the X-axis direction (in the curve direction) even if the array substrate 10A and the counter substrate 10B included in the flat liquid crystal panel 20 are reshaped in the flat liquid crystal panel reshaping step. This feature makes further sure that light passing through the color filter 15 passes the pixel electrode 12 overlapping the color filter 15, and appropriately sets levels of gray to be displayed by the pixels PX adjacent to each other in the X-axis direction. Meanwhile, the light shield 16 provided to the counter substrate 10B is shaped into a strip extending in the X-axis direction. Such a feature keeps the light shield 16 from displacement in the X-axis direction in relation to a pixel PX closer to the array substrate 10A even if the array substrate 10A and the counter substrate 10B included in the flat liquid crystal panel 20 are reshaped in the flat liquid crystal panel reshaping step. Hence, the light passing through the pixels PX is less likely to be blocked inadvertently, appropriately setting the levels of gray to be displayed by the pixels PX. Note that the curved liquid crystal panel 10 is produced through the flat liquid crystal panel production step and the flat liquid crystal panel reshaping step. This is because, if the faces of the array substrate 10A and the counter substrate 10B are not flat when various kinds of films are deposited and patterned on the inner faces of the array substrate 10A and the counter substrate 10B, structures formed of the films by the patterning are not sufficiently precise in position and dimension. Another reason is that it is difficult to produce the curved liquid crystal panel 10, using a conventional production apparatus.

Not all the pixels PX function normally. An example of possible defects is a bright dot defect in which a pixel PX is always recognized bright. The bright dot defect is a cause of significant deterioration in display quality. In this embodiment, the defective pixel PX is repaired to appear dark. Hence, the method for producing the curved liquid crystal panel 10 according to this embodiment includes: an inspection step for inspecting the pixels PX; and a repair step for repairing a bright dot defect to appear dark, in accordance with a result of the inspection in the inspection step. In this embodiment, the inspection step and the repair step are included in the flat liquid crystal panel production step. That is, the inspection step and the repair step are performed on the flat liquid crystal panel 20 while the display surface 10DS is flat. This is because it is difficult to perform the inspection step and the repair step on the curved liquid crystal panel 10 with the display surface 10DS curved. The inspection step involves, for example, inputting an inspection signal to the gate wires and the source wires 13 to control the pixels PX while an inspection backlight apparatus emits light to the flat liquid crystal panel 20, and displaying an inspection image on the display surface 10 DS. If, in the inspection step, for example, a pixel PX passing light is found in an image included in the inspection image and displayed in black (a full-screen image displayed with the lowest level of gray), the pixel PX is detected as the bright dot defect, and position information on the bright dot defect (information on coordinates in the X-axis and the Y-axis) is extracted. The repair step involves processing the light shield 16 using a laser beam emitted to a specific portion of the light shield 16 on the counter substrate 10B in accordance with the result of the inspection in the inspection, and diffusing the light-shielding material, contained in the light shield 16, into an area overlapping the pixel PX having the bright dot defect. This is how to repair the bright dot defect to appear dark. Here, the portion of the light shield 16 irradiated with the laser beam is determined in accordance with the position information on the bright dot defect to be extracted in the inspection step. However, when the array substrate 10A and the counter substrate 10B, which are included in the flat liquid crystal panel 20 undergoing the inspection step and the repair step in the production, are reshaped in the flat liquid crystal panel reshaping step such that the display surface 10DS curves, an area 16DA in which the light-shielding material diffuses could be displaced in the X-axis direction in relation to the pixel PX having the bright dot defect. This is because the light shield 16 to be processed in the repair step extends in the X-axis direction, and it is difficult for a worker to recognize the portion to be processed in the light shield 16.

Hence, as illustrated in FIGS. 6 to 9, the counter substrate 10B included in the curved liquid crystal panel 10 according to this embodiment is provided with an indicator 18 serving as a position indicator of each of the pixels PX in the X-axis direction. Note that in FIGS. 6 to 9, the light shield 16 and the indicator 18 while the display surface 10DS is flat are illustrated in solid lines, and longitudinal sides of an outline of the pixel PX while the display surface 10DS is flat are illustrated in dot-and-dash lines. The indicator 18 is integrally provided to the light shield 16 extending in the X-axis direction, and protrudes from the light shield 16 in the Y-axis direction. That is, the indicator 18 is made of the same light-shielding material as the light shield 16 is. The indicator 18, a quadrangle in plan view, has sides defining its outline and lying in parallel with the X-axis or the Y-axis. The outline of the indicator 18 includes a pair of sides extending in the Y-axis direction in parallel with the longitudinal sides of the outline of the pixel PX. In this embodiment, especially the left side (a reference side) of the indicator 18 illustrated in FIGS. 6 to 9 mainly serves as a position indicator of the pixel PX in the X-axis direction. The indicator 18 is provided to protrude in the Y-axis direction from opposing sides of the light shield 16. That is, the indicator 18 is provided in a pair to sandwich the light shield 16 in the Y-axis direction. The indicator 18 includes a plurality of indicators 18 aligned at intervals in the X-axis direction. The indicators 18 are individually provided to the pixels PX aligned in the X-axis direction. That is, the indicators 18 arranged in the X-axis direction are the same in number as the pixels PX arranged in the X-axis direction. As can be seen, among pairs of the indicators 18 integrally provided to a pair of light shields 16 sandwiching the pixels PX in the Y-axis direction, two of the indicators 18 provided between the pair of light shields 16 and protruding toward a PX serve as position indicators of the pixel PX in the X-axis direction.

As illustrated in FIGS. 6 to 9, the indicators 18 are aligned at intervals in the X-axis direction, and arranged so that positional relationship of the indicators 18 with the pixels PX while the display surface 10DS is flat varies in accordance with a position of the counter substrate 10B in the X-axis direction. In accordance with graphs in FIG. 10, the alignment is determined of the indicators 18 at intervals in the X-axis direction on the basis of the position of the counter substrate 10B. FIG. 10 shows graphs plotted to show conceivable displacements of pixels PX in the X-axis direction observed when the flat liquid crystal panel 20 is curved. FIG. 10 shows graphs in a solid line and a broken line together. The graph in the solid line shows the case where glass substrates of a pair of the substrates 10A and 10B have a thickness of 0.5 mm; whereas, the graph in the broken line shows the case where glass substrates of the pair of the substrates 10A and 10B has a thickness of 0.25 mm. The graphs in FIG. 10 are of, for example, pixels PX positioned in a Y-axis-wise center inside the display surface 10DS and found on a straight line (a reference line) in the X-axis direction. The horizontal axis of FIG. 10 indicates a distance (in "mm") in the X-axis direction from the left end of the flat liquid crystal panel 20 illustrated in FIG. 5. Hence, the distance 0 mm on the horizontal axis of FIG. 10 corresponds to the left end position of the flat liquid crystal panel 20 in FIG. 5. The distance 350 mm on the horizontal axis of FIG. 10 corresponds to the right end position of the flat liquid crystal panel 20 in FIG. 5. The distance 175 mm on the horizontal axis of FIG. 10 corresponds to the center position of the flat liquid crystal panel 20 in FIG. 5. The vertical axis of FIG. 10 indicates the conceivable displacement (in "μm") of pixel PX in the X-axis direction and a direction (a plus sign and a minus sign) of the X-axis from the center position. More specifically, the plus sign of the vertical axis in FIG. 10 shows that a pixel PX is displaced from the center position in the X-axis direction toward the left in FIG. 5. The minus sign of the vertical axis in FIG. 10 shows that a pixel PX is displaced from the center position in the X-axis direction toward the right in FIG. 5.

FIG. 10 shows that even if the glass substrates of the pair of the substrates 10A and 10B have a thickness of either 0.5 mm or 0.25 mm, the conceivable displacement of a pixel PX is substantially 0 μm in the center position (in the position of "175 mm") in the X-axis direction and in the opposing end positions (in the positions of "0 mm" and "350 mm") in the X-axis direction. This is because, in the center position of the array substrate 10A and the counter substrate 10B in the X-axis direction, neither of the substrates 10A nor 10B is rarely displaced relatively when the flat liquid crystal panel 20 curves. Moreover, in the opposing end positions of the array substrate 10A and the counter substrate 10B in the X-axis direction, the seal 10D fasten both of the substrates 10A and 10B. That is why neither of the substrates 10A nor 10B is rarely displaced relatively when the flat liquid crystal panel 20 curves. In contrast, in the positions of the array substrate 10A and the counter substrate 10B in the X-axis direction other than the center position and the opposing end positions, the conceivable displacements of pixels PX mark a value other than 0 µm. Specifically, if the glass substrates of the pair of the substrates 10A and 10B have a thickness of 0.5 mm, the absolute values of the conceivable displacements of pixels PX mark the largest value of approximately 24 µm near the positions of "80 mm" and "270 mm". If the glass substrates of the pair of the substrates 10A and 10B have a thickness of 0.25 mm, the absolute values of the conceivable displacements of pixel PXs mark the largest value of approximately 15 µm near the positions of "40 mm" and "310 mm". Even if the glass substrates have a thickness of either 0.5 mm or 0.25 mm, the absolute value of the conceivable displacement of a pixel PX gradually decreases as the pixel PX moves from the position in which the absolute value of the conceivable displacement is largest and comes closer to the center position and to the opposing end positions in the X-axis direction.

Figure 6:
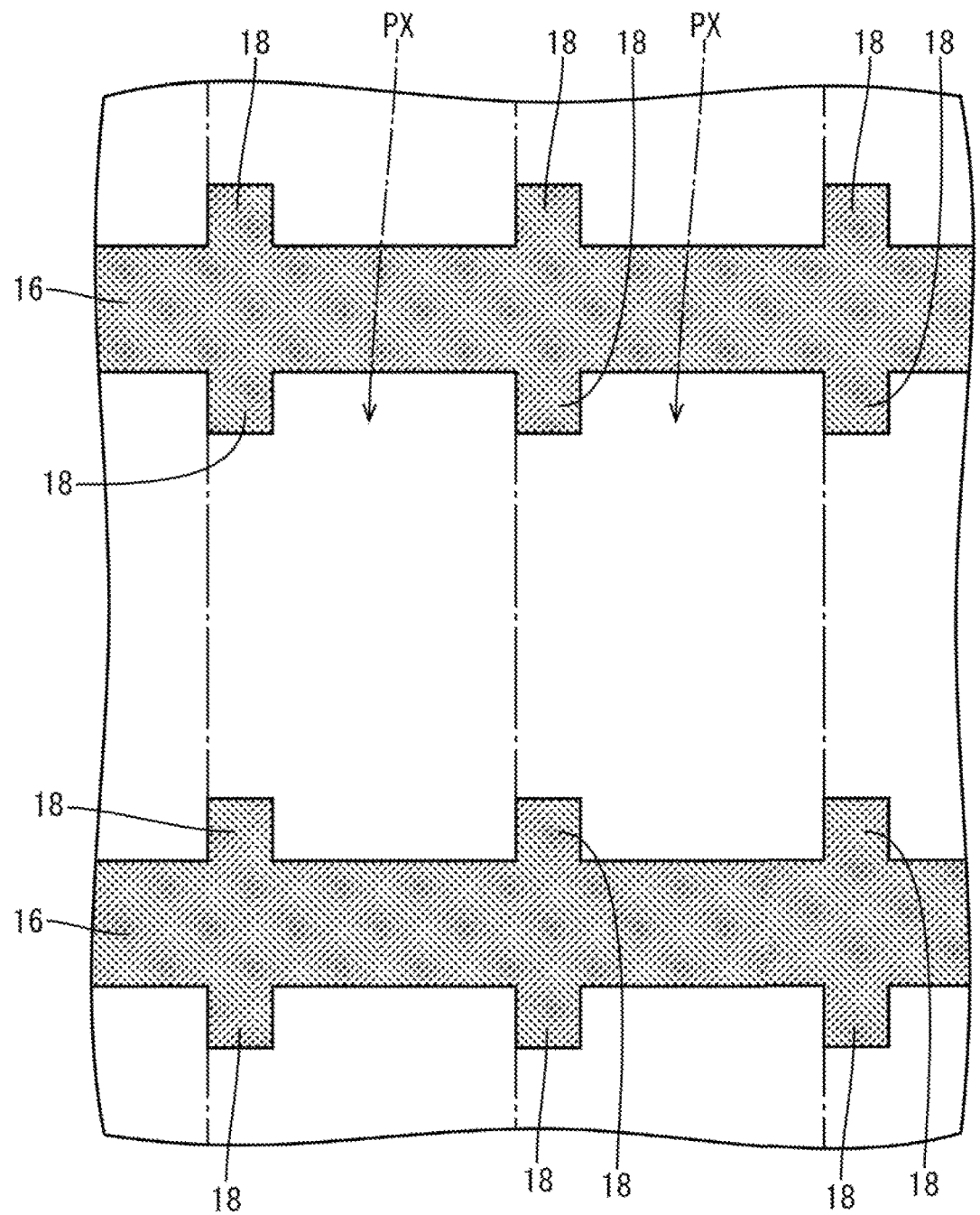
FIG. 6 is a plan view illustrating light shields and indicators included in a center portion of a counter substrate included in the flat liquid crystal panel.
Figure 7:
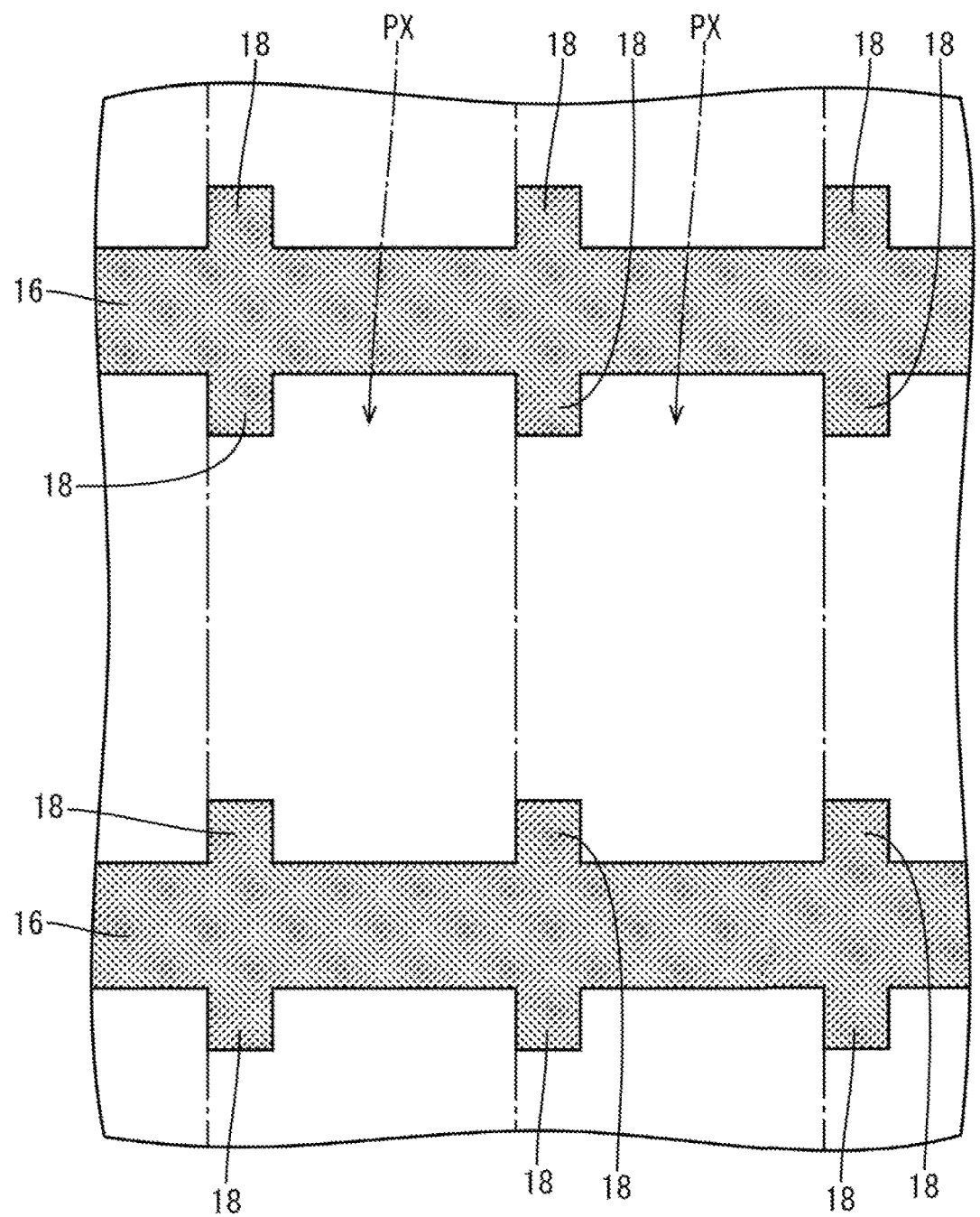
FIG. 7 is a plan view illustrating light shields and indicators included in an end portion of the counter substrate included in the flat liquid crystal panel.

Specifically described below is the indicators 18 arranged in accordance with the graphs in FIG. 10. First, the counter substrate 10B is divided into three portions; that is, a center portion 10BC positioned in a center in the X-axis direction, an end portion 10BE positioned toward an end in the X-axis direction, and an intermediate portion 10BI positioned between the center portion 10BC and the end portion 10BE. In the center portion 10BC, the indicators 18 are arranged as illustrated in FIG. 6 so that the positional relationship of the indicators 18 with the pixels PX while the display surface is flat substantially coincides with the positional relationship of the indicators 18 with the pixels PX while the display surface 10DS is curved. In the end portion 10BE, the indicators 18 are arranged as illustrated in FIG. 7 so that the positional relationship of the indicators 18 with the pixels PX while the display surface is flat substantially coincides with the positional relationship of the indicators 18 with the pixels PX while the display surface 10DS is curved. Specifically, when arranged in the center portion 10BC and the end portion 10BE in which a conceivable displacement is substantially 0 µm of the pixels PX observed when a pair of the substrates 10A and 10B curve, the indicators 18 are disposed in contact with longitudinal sides of outlines of the pixels PX while the display surface 10DS is flat.

Figure 8:
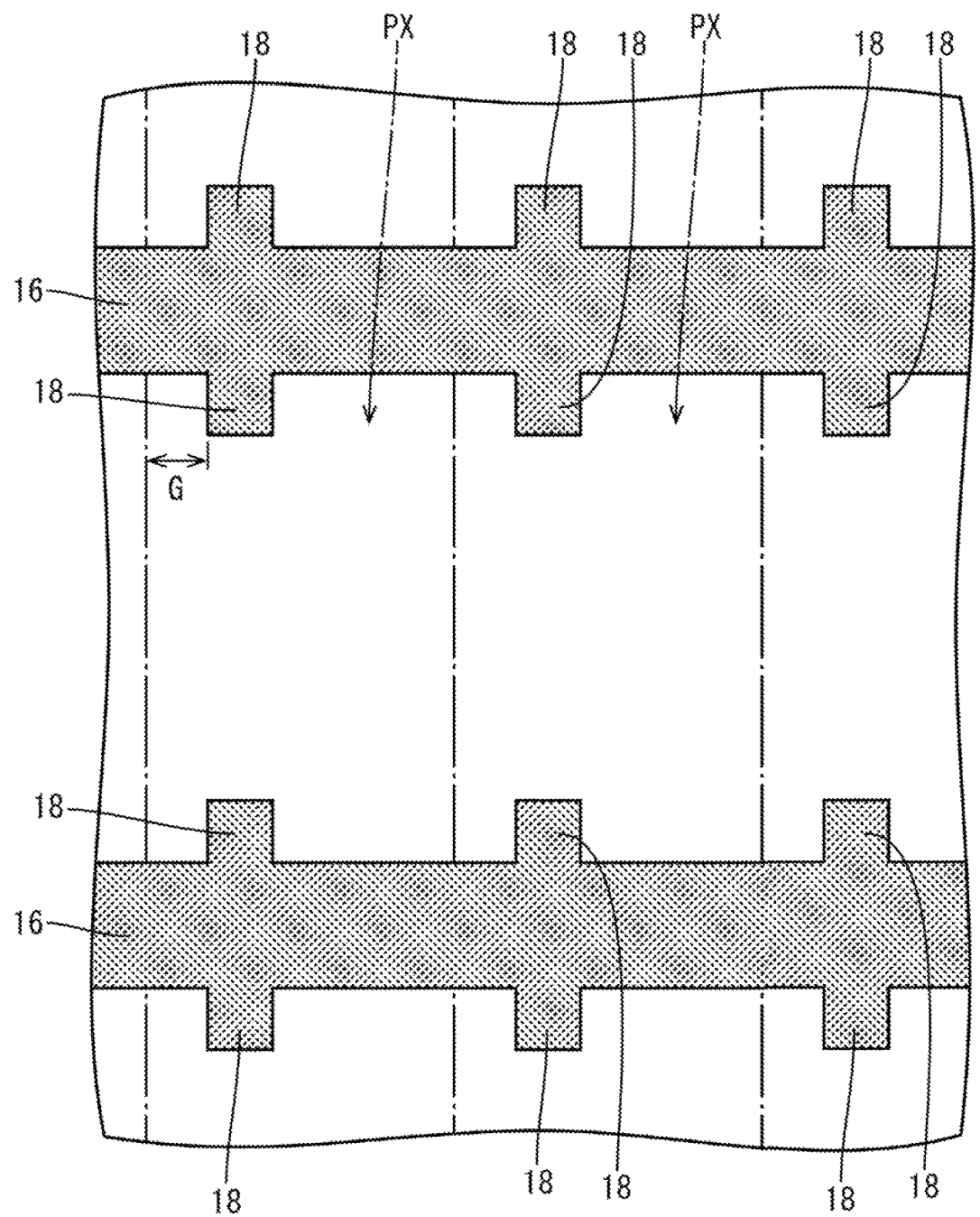
FIG. 8 is a plan view illustrating light shields and indicators included in an intermediate portion of the counter substrate included in the flat liquid crystal panel, the indicators being positioned where an absolute value of a conceivable displacement for each pixel is largest.
Figure 9:
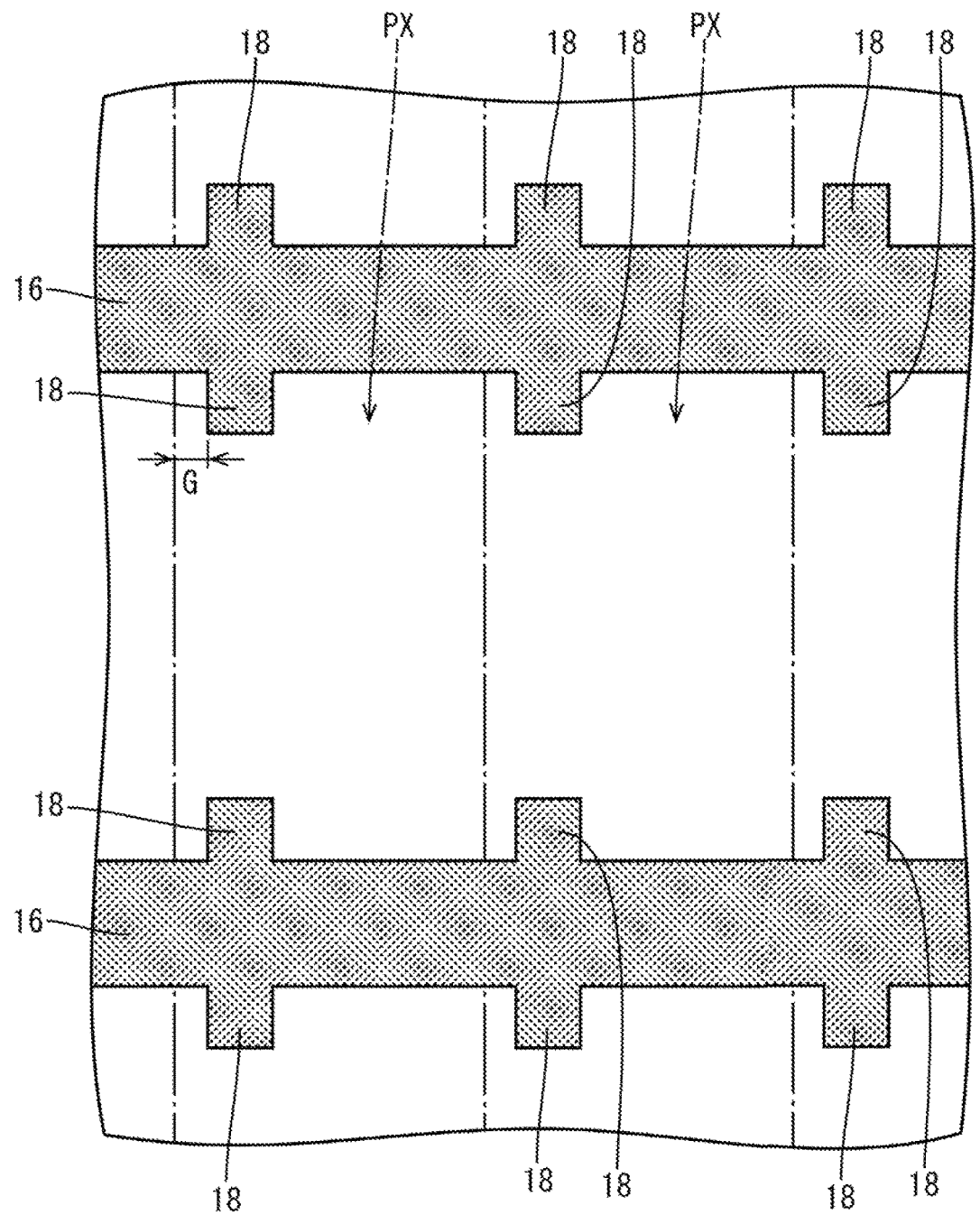
FIG. 9 is a plan view illustrating light shields and indicators included in the intermediate portion of the counter substrate included in the flat liquid crystal panel, the indicators being positioned where an absolute value of a conceivable displacement for each pixel is approximately half as large as the largest absolute value.
Figure 10:
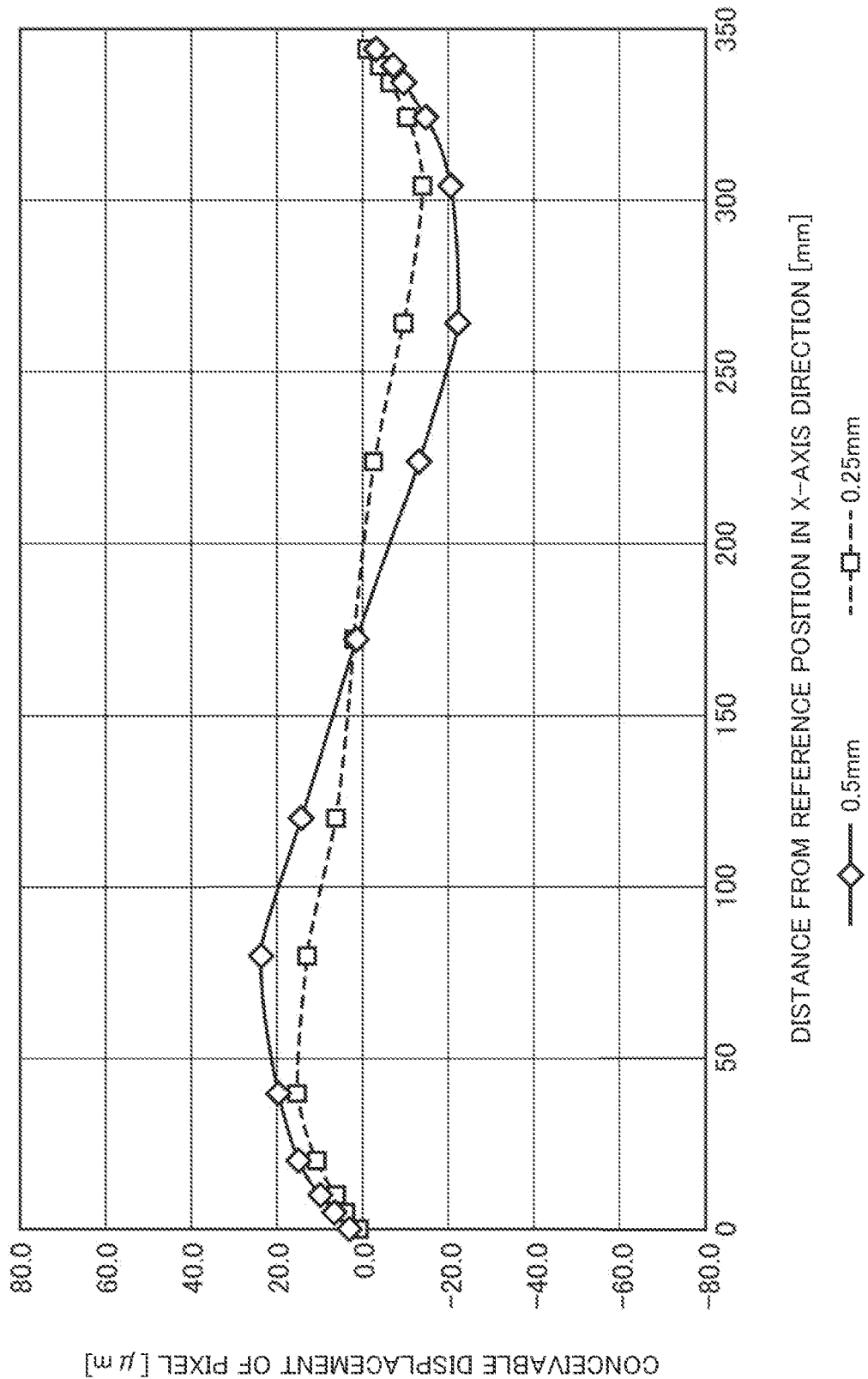
FIG. 10 illustrates graphs plotted to show conceivable displacements of pixels in the X-axis direction when the flat liquid crystal panel is curved.

Whereas, in the intermediate portion 10BI, the indicators 18 are arranged as illustrated in FIGS. 8 and 9 so that the positional relationship of the indicators 18 with the pixels PX while the display surface 10DS is flat is different from the positional relationship of the indicators 18 with the pixels PX while the display surface 10DS is curved. Specifically, when disposed in the intermediate portion 10BI in which an absolute value of a conceivable displacement is 0 µm or greater of the pixels PX observed while the pair of the substrates 10A and 10B is curved, each indicator 18 is spaced at a clearance G from a longitudinal side of an outline of a pixel PX while the display surface 10DS is flat. This clearance G is substantially the same as the conceivable displacement of the pixel PX observed when the flat liquid crystal panel 20 curves. The indicators 18 arranged in the intermediate portion 10BI vary in the positional relationship with the pixels PX while the display surface 10DS is flat; that is, the clearance G to the longitudinal side of the outline of each of the pixel PX varies in accordance with the position of the counter substrate 10B in the X-axis direction. The indicators 18 are arranged so that the clearance G becomes smaller toward the center portion 10BC and the opposing end portions 10BE. Specifically, when an indicator 18 among the indicators 18 arranged in the intermediate portion 10BI is in a position where the absolute value of the conceivable displacement for a pixel PX is largest when the pair of the substrates 10A and 10B curves, the clearance G between the indicator 18 and a longitudinal side of the outline of the pixel PX is longest while the display surface 10DS is flat as illustrated in FIG. 8. As illustrated in FIG. 9, the indicators 18 in the intermediate portion 10BI is arranged so that the clearance G to a longitudinal line of the outline of each of the pixels PX while the display surface 10DS is flat is gradually shorter, as each of the indicators 18 moves in the X-axis direction away from a position where the absolute value of the conceivable displacement for each pixel PX is largest toward the center portion 10BC and the opposing end portions 10BE. Note that, of FIGS. 8 and 9, FIG. 8 illustrates indicators 18 positioned where the absolute value of the conceivable displacement for each pixel PX is largest in the intermediate portion 10BI. FIG. 9 illustrates indicators 18 positioned where the absolute value of the conceivable displacement for each pixel PX is approximately half as large as the largest absolute value of the conceivable displacement for a pixel PX in the intermediate portion 10BI.

Figure 11:
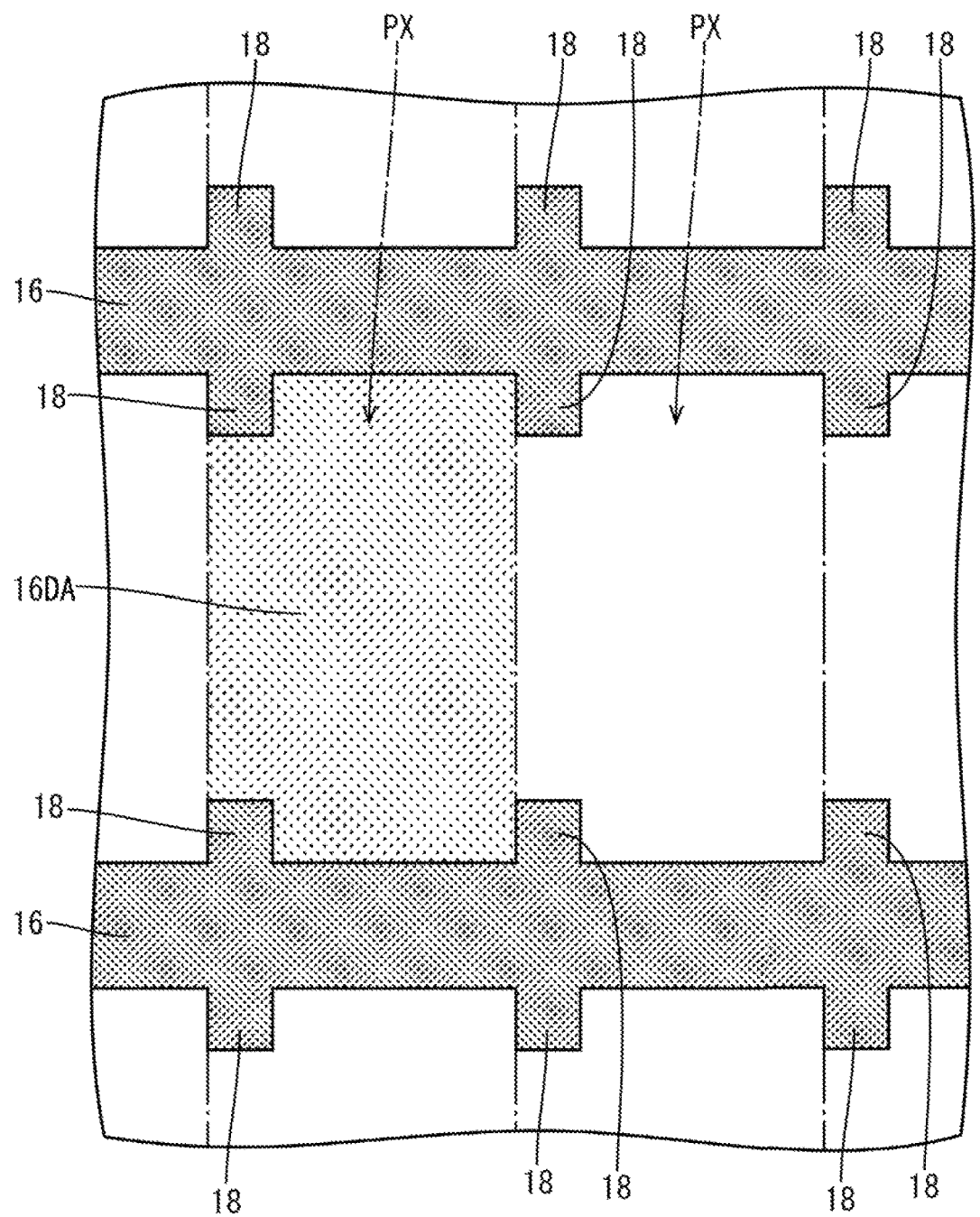
FIG. 11 is a plan view illustrating light shields and indicators included in the center portion of the counter electrode included in the flat liquid crystal panel after a repair step.
Figure 12:
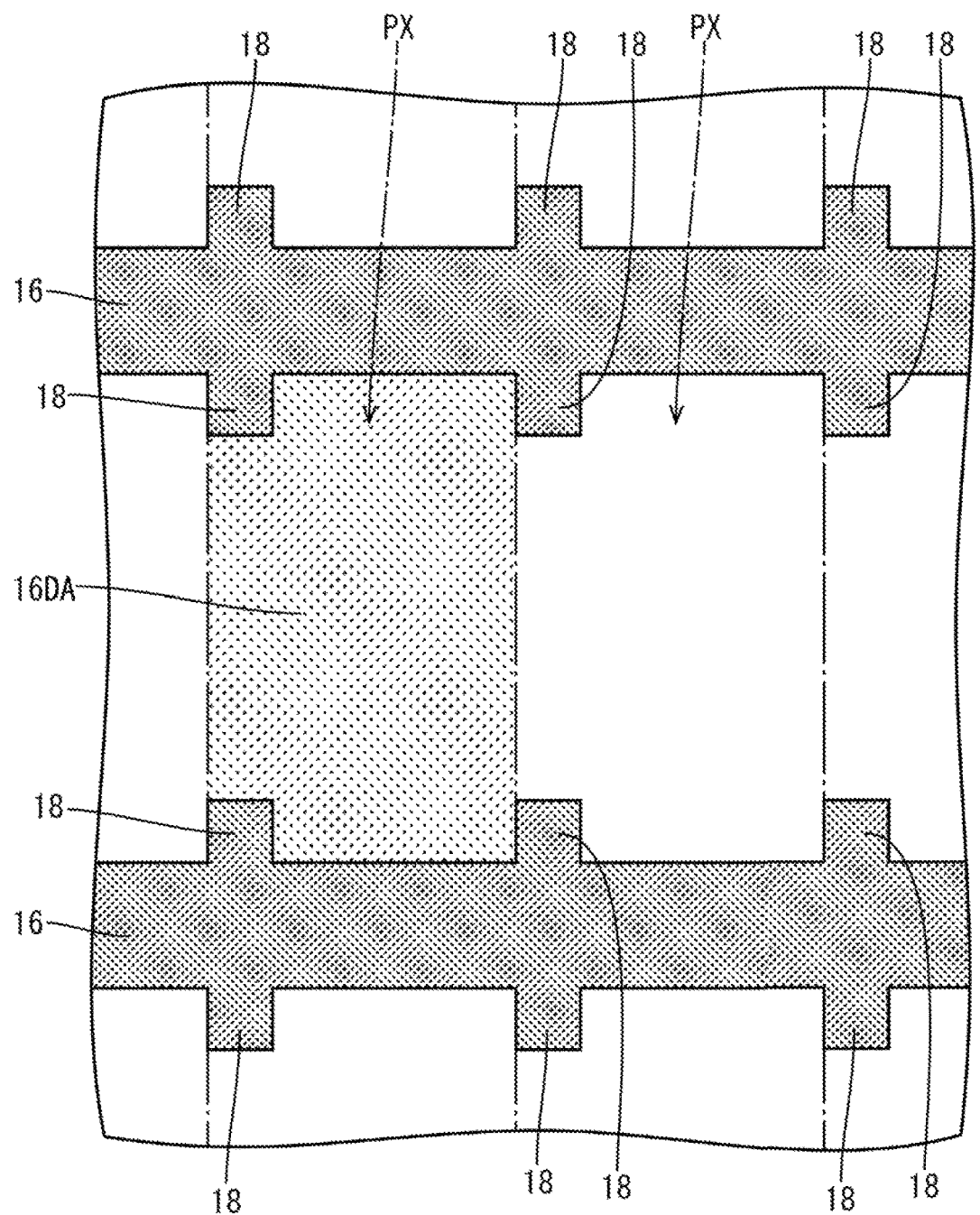
FIG. 12 is a plan view illustrating light shields and indicators included in the end portion of the counter electrode included in the flat liquid crystal panel after the repair step.
Figure 13:
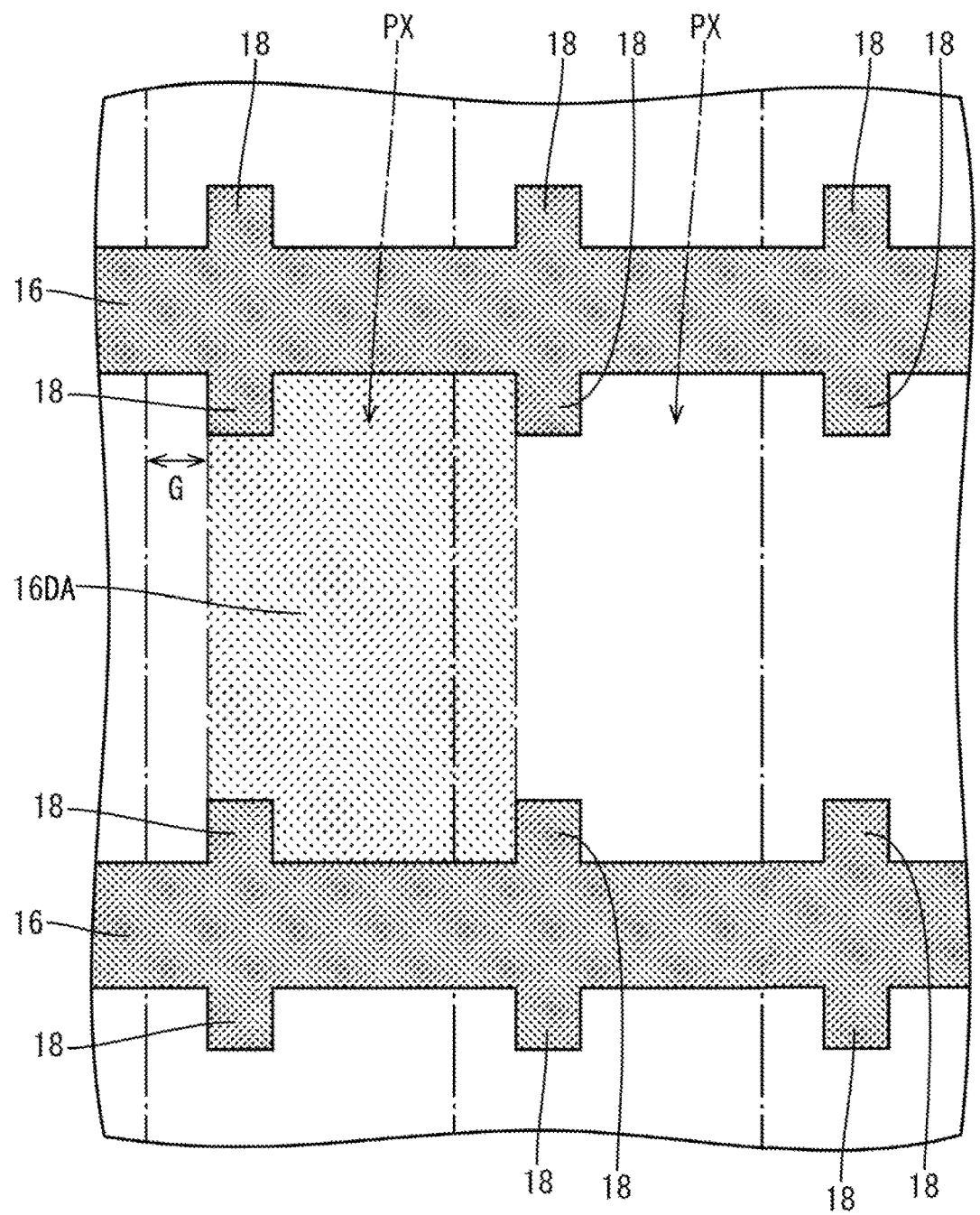
FIG. 13 is a plan view illustrating light shields and indicators included in the intermediate portion of the counter substrate included in the flat liquid crystal panel after the repair step, the indicators being positioned where an absolute value of a conceivable displacement for each pixel is largest.
Figure 14:
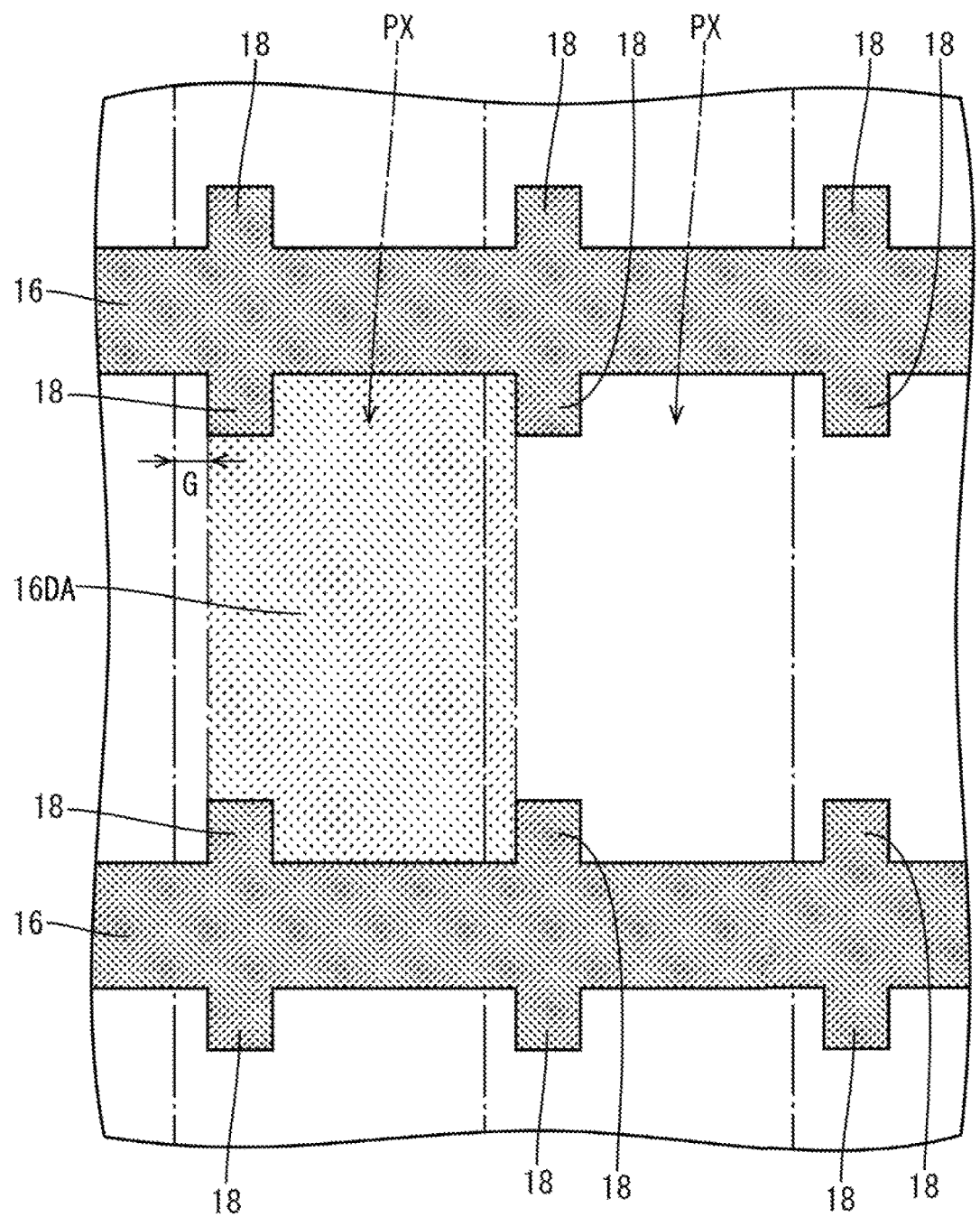
FIG. 14 is a plan view illustrating light shields and indicators included in the intermediate portion of the counter substrate included in the flat liquid crystal panel after the repair step, the indicators being positioned where an absolute value of a conceivable displacement for each pixel is approximately as half as the largest absolute value.

Specifically described below is the repair step using the indicators 18 in the above configuration. In the repair step, in accordance with position information on a bright dot defect extracted in the inspection step conducted before, a laser beam is emitted to a specific portion of the light shield 16 on the counter substrate 10B. Here, among the indicators 18 integrally provided to the light shield 16, an indicator 18 matching the position information on the bright dot defect is specified. In accordance with the specified indicator 18, the portion of the light shield 16 to be irradiated with the laser beam (a processed portion) is specified. As illustrated in FIGS. 11 to 14, when the laser beam is emitted to the specific portion of the light shield 16, the portion of the light shield 16 irradiated with the laser beam is processed and the light-shielding material contained in the irradiated portion is diffused. The laser beam is emitted while, as illustrated in FIGS. 11 to 14, a left side of an area 16DA, in which the light-shielding material is diffused, is adjusted to match a left side (a reference side) of the specified indicator 18. Note that, in FIGS. 11 to 14, the area 16DA, in which the light-shielding material is diffused, is shaded to be distinguished from the light shield 16. As illustrated in FIGS. 11 and 12, in the center portion 10BC and the opposing end portions 10BE of the counter substrate 10B, almost all the area 16DA, in which the light-shielding material is diffused with the emitted laser beam, overlaps a pixel PX while the display surface 10DS is flat. Substantially very little portion of the area 16DA does not overlap the pixels PX. In contrast, in the intermediate portion 10BI of the counter substrate 10B illustrated in FIGS. 13 and 14, most of the area 16DA, in which the light-shielding material is diffused with the emitted laser beam, overlaps a pixel PX while the display surface 10DS is flat. However, a portion of the area 16DA does not overlap the pixel PX. Specifically, the area 16DA, in which the light-shielding material is diffused with the emitted laser beam, includes an overlapping area overlapping the pixel PX while the display surface 10DS is flat. The overlapping area is smallest when the pixel PX in the intermediate portion 10BI is positioned to have the largest absolute value of the conceivable displacement. The overlapping area becomes larger as the pixel PX is farther away from the intermediate portion 10BI in the X-axis direction.

Figure 15A:
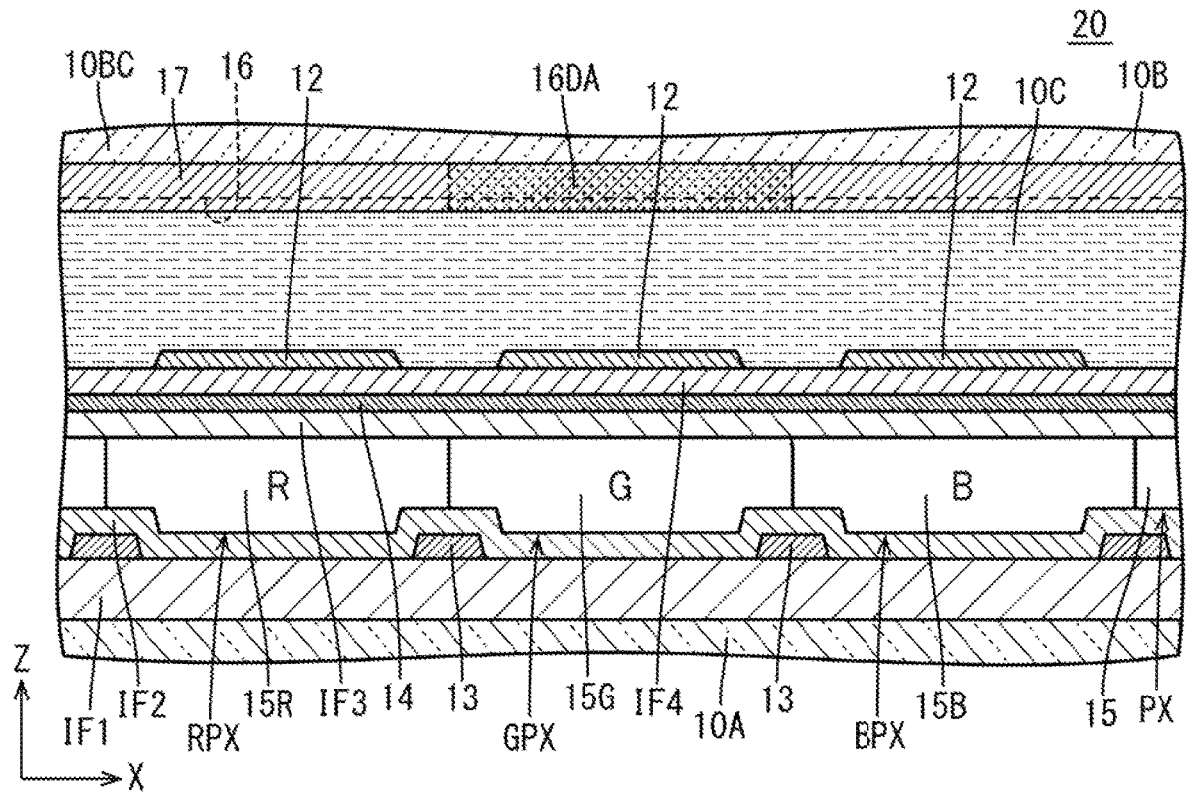
FIG. 15A is a cross-sectional view of the flat liquid crystal panel after the repair step and before a flat liquid crystal panel reshaping step, the cross-sectional view illustrating the center portion of the counter substrate.
Figure 15B:
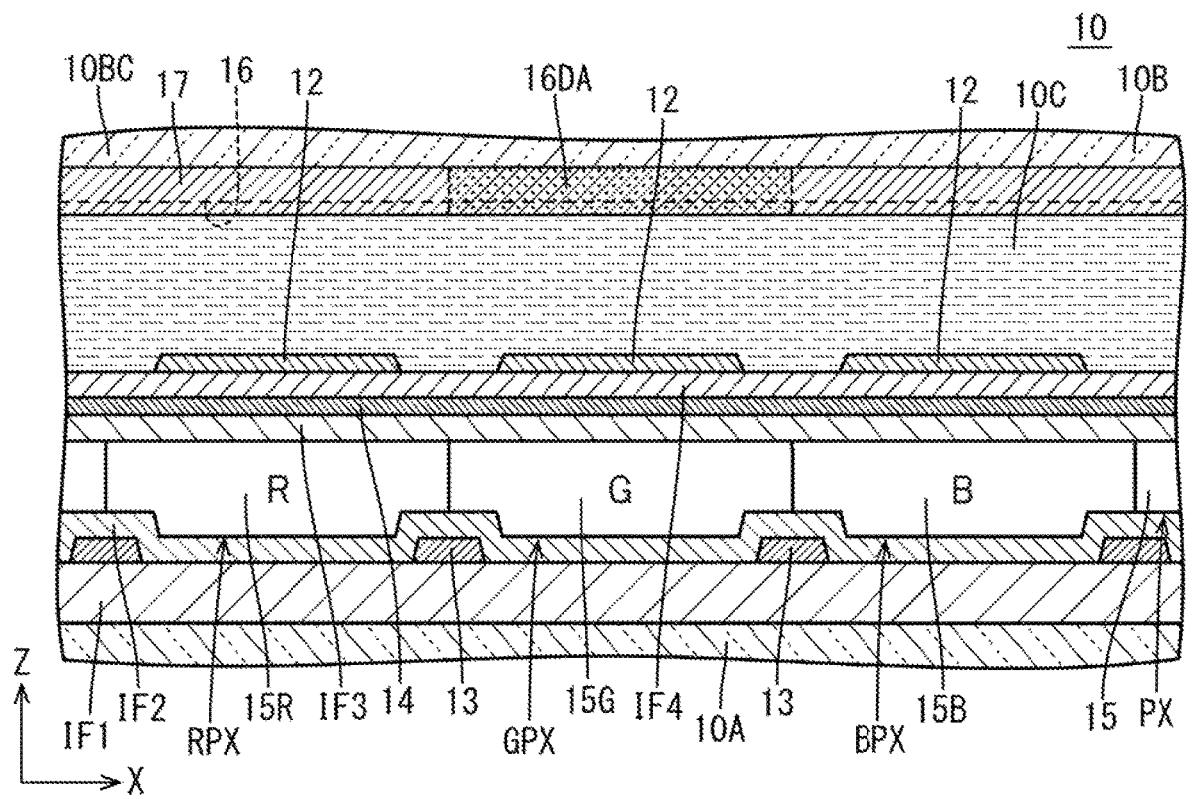
FIG. 15B is a cross-sectional view of the curved liquid crystal panel after the flat liquid crystal panel deformation step, the cross-sectional view illustrating the center portion of the counter substrate.
Figure 16A:
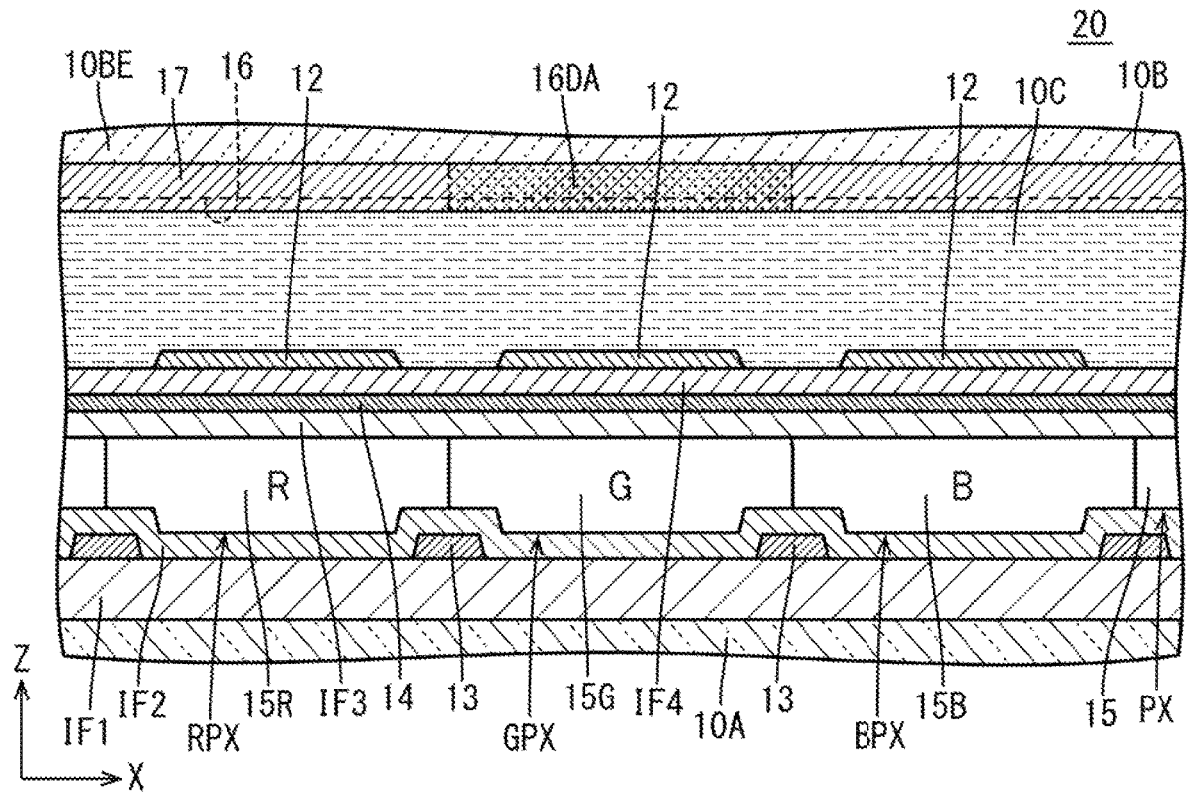
FIG. 16A is a cross-sectional view of the flat liquid crystal panel after the repair step and before the flat panel reshaping step, the cross-sectional view illustrating the end portion of the counter substrate.

After the end of the repair step as described above, the flat liquid crystal panel reshaping step is carried out as illustrated in FIGS. 15A to 18B. Among FIGS. 15A to 18B, FIGS. 15A, 16A, 17A, and 18A illustrate cross-sectional views of the flat liquid crystal panel 20 after the repair step and before the flat liquid crystal panel reshaping step;

whereas, FIGS. 15B, 16B, 17B, and 18B illustrate cross-sectional views of the curved liquid crystal panel 10 after the flat liquid crystal panel reshaping step. Note that, in FIGS. 15A to 18B, the area 16DA in which the light-shielding material is diffused is shaded. First, after the repair step ends and before the flat liquid crystal panel reshaping step starts, as illustrated in FIGS. 15A and 16A, almost all the area 16DA in which the light-shielding material is diffused overlaps the pixel PX in the center portion 10BC and the opposing end portions 10BE of the counter substrate 10B. In contrast, in the intermediate portion 10BI of the counter substrate 10B illustrated in FIGS. 17A and 18A, most of the area 16DA in which the light-shielding material is diffused overlaps the pixel PX; whereas, a portion of the area 16DA does not overlap the pixel PX.

Figure 16B:
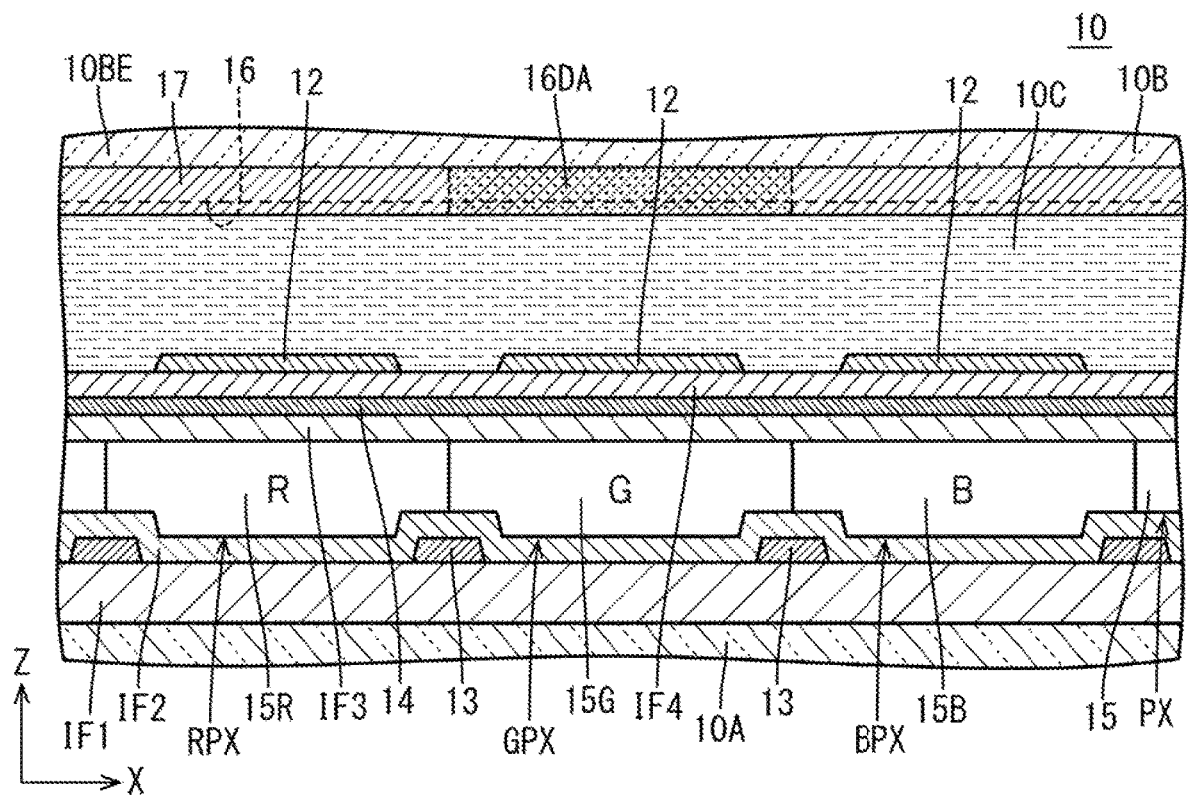
FIG. 16B illustrates a cross-sectional view of the curved liquid crystal panel after the flat liquid crystal panel reshaping step, the cross-sectional view illustrating the end portion of the counter substrate.
Figure 17A:
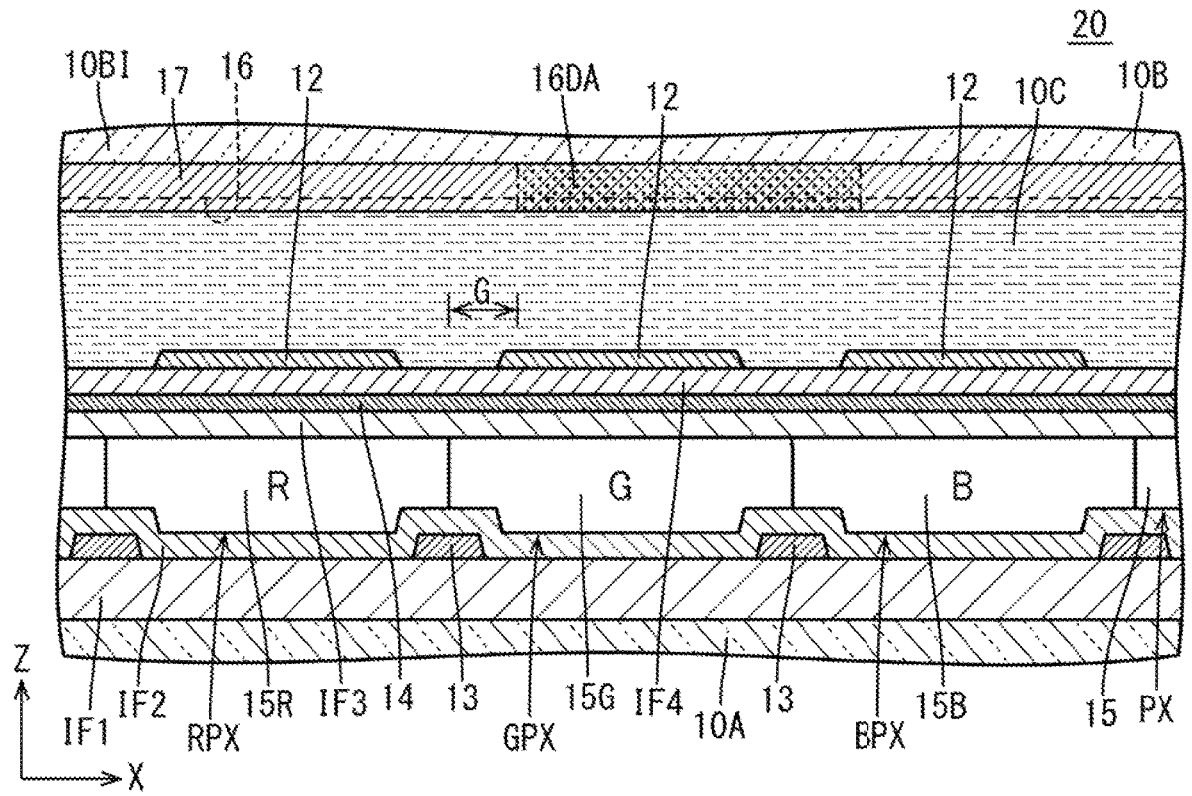
FIG. 17A is a cross-sectional view of the flat liquid crystal panel after the repair step and before the flat liquid crystal panel formation step, the cross-sectional view illustrating the vicinity of a position where an absolute value of a conceivable displacement for a pixel in the intermediate portion of the counter substrate is largest.
Figure 17B:
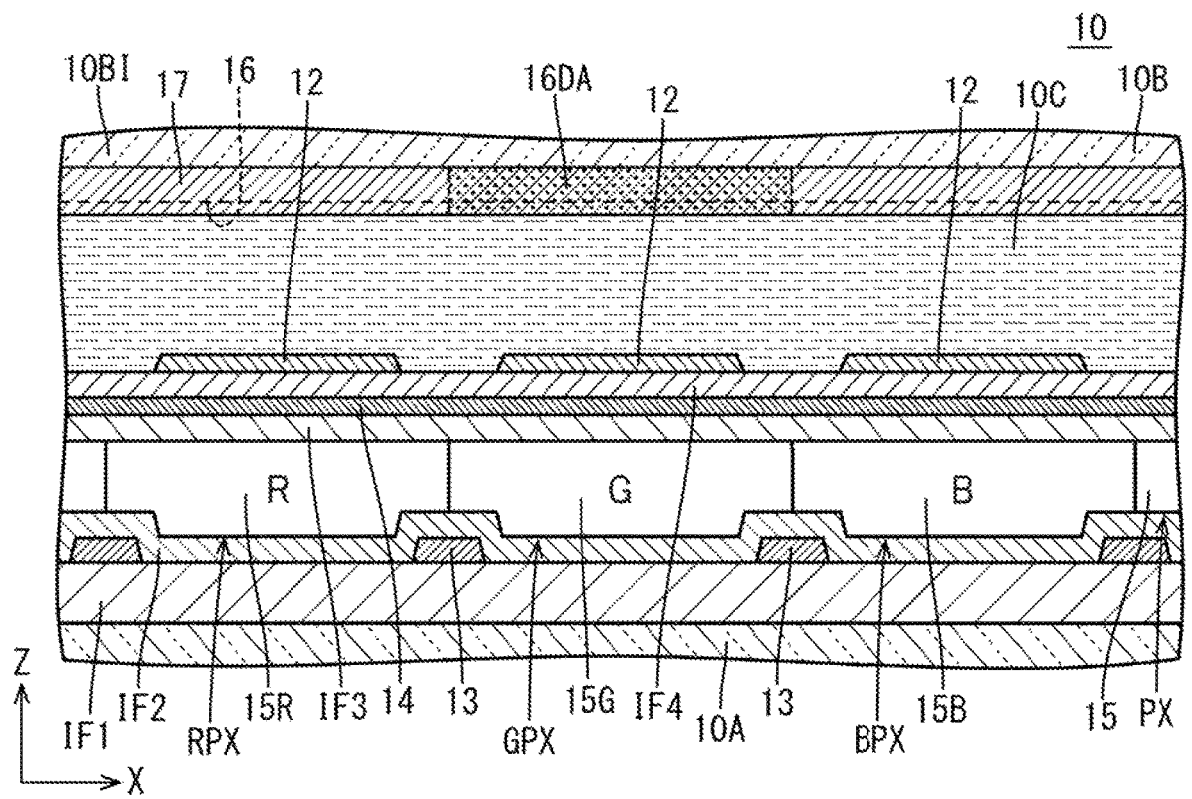
FIG. 17B is a cross-sectional view of the curved liquid crystal panel after the flat liquid crystal panel reshaping step, the cross-sectional view illustrating the vicinity of a position where an absolute value of a conceivable displacement for a pixel in the intermediate portion of the counter substrate is largest.
Figure 18A:
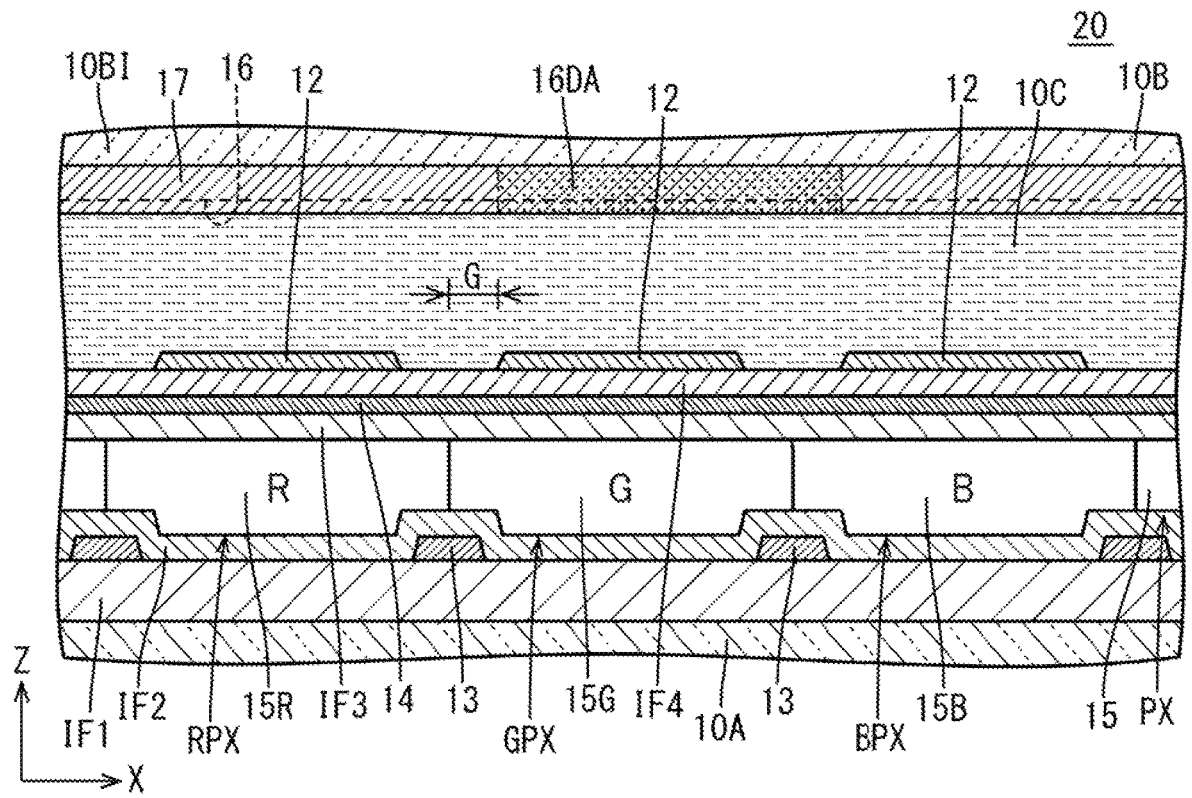
FIG. 18A is a cross-sectional view of the flat liquid crystal panel after the repair step and before the flat liquid crystal panel reshaping step, the cross-sectional view illustrating the vicinity of a position where an absolute value of a conceivable displacement for a pixel in the intermediate portion of the counter substrate is half as large as the largest absolute value.
Figure 18B:
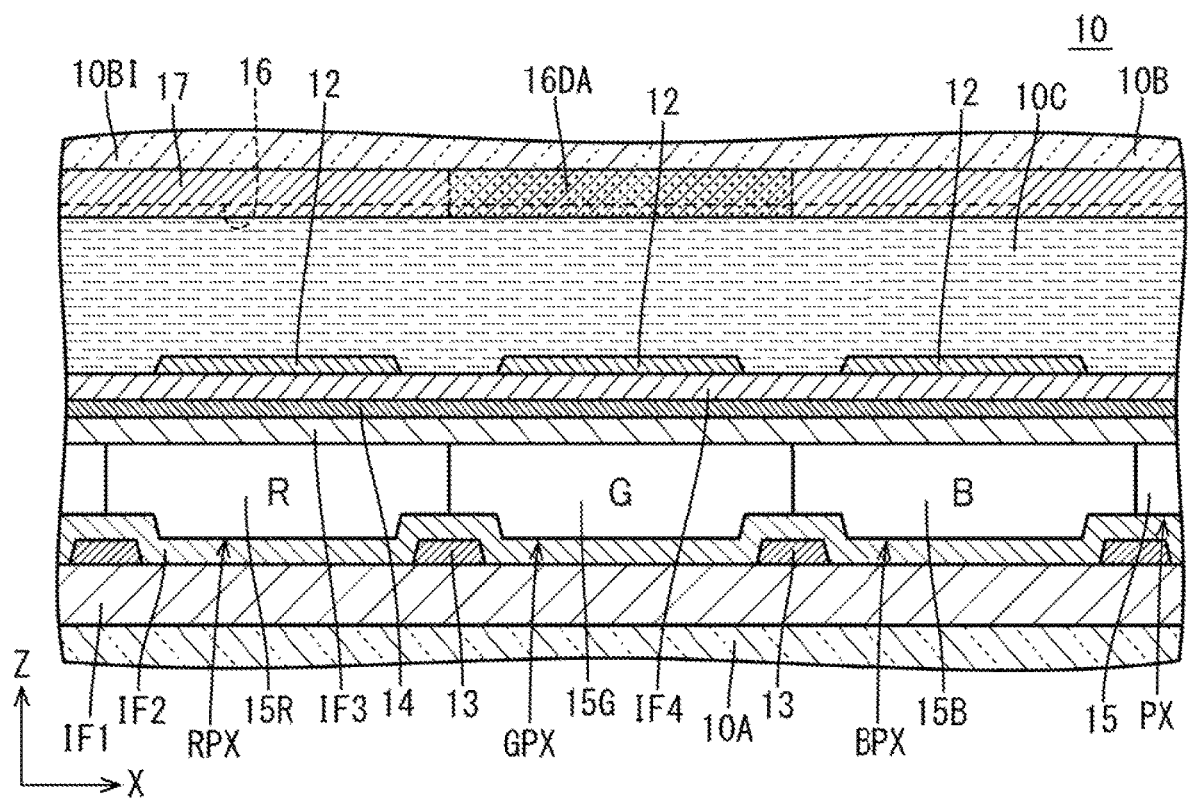
FIG. 18B is a cross-sectional view of the curved liquid crystal panel after the flat liquid crystal panel reshaping step, the cross-sectional view illustrating the vicinity of a position where an absolute value of a conceivable displacement for a pixel in the intermediate portion of the counter substrate is half as large as the largest absolute value.

When the array substrate 10A and the counter substrate 10B are reshaped in the flat liquid crystal panel reshaping step, the area 16DA, in which the light-shielding material included in the counter electrode 10B is diffused, can be displaced relatively in the X-axis direction in relation to the pixel PX included in the array substrate 10A. Here, in the center portion 10BC and the opposing end portions 10BE of the counter substrate 10B as illustrated in FIGS. 15B and 16B, the area 16DA in which the light-shielding material is diffused is rarely displaced relatively in the X-axis in relation to the pixel PX. Hence, almost all the area 16DA in which the light-shielding material is diffused keeps overlapping the pixel PX as it is. In contrast, in the intermediate portion 10BI of the counter substrate 10B as illustrated in FIGS. 17B and 18B, the area 16DA, in which the light-shielding material is diffused, is relatively displaced in the X-axis direction in relation to the pixel PX. The relative displacement of the area 16DA, in which the light-shielding material is diffused, in relation to this pixel PX substantially match the conceivable displacement of the pixel PX illustrated in the graphs of FIG. 10. Hence, in this embodiment, the indicator 18 for processing the light shield 16 shifts in the X-axis direction in relation to the pixel PX while the display surface 10DS is flat, allowing for the considerable displacement of the pixel PX in the intermediate portion 10BI. Hence, when the area 16DA, in which the light-shielding material is diffused, relatively displaces in the X-axis direction while the flat liquid crystal panel reshaping step is carried out, almost all the area 16DA in which the light-shielding material is diffused overlaps the pixel PX. As can be seen, no matter where in the X-axis direction the pixel PX having a bright dot defect is positioned inside the display surface 10DS, the area 16DA of the counter substrate 10B, in which the light-shielding material is diffused by repair, is positioned to overlap the pixel PX having the bright dot defect. Such a feature makes it difficult to cause a displacement in the X-axis direction in the reshaping. Thanks to the feature, the bright dot defect can appear appropriately dark, and deterioration in display quality due to the bright dot defect is less likely to occur.

As can be seen, the curved liquid crystal panel (the curved display panel) 10 includes the display surface 10DS curving at least around the curve axis CAX and displaying an image. The curved display panel 10 includes: the array substrate (a first substrate) 10A; the counter substrate (a second substrate) 10B spaced apart from, and facing, the array substrate 10A; the pixels PX provided to the array substrate 10A, and arranged in a matrix inside the display surface 10DS; the light shield 16 provided to the counter substrate 10B, extending in a curve direction of the display surface 10DS, and dividing the pixels PX adjacent to each other in an orthogonal-to-curve direction extending along the display surface 10DS and orthogonal to the curve direction; and the indicator 18 provided to the counter substrate 10B, and serving as a position indicator of each of the pixels PX in the curve direction.

Thanks to the above features, the array substrate 10A is provided with the pixels PX arranged in a matrix inside the display surface 10DS. The pixels PX display an image on the curved display surface 10DS. The light shield 16 provided to the counter substrate 10B extends in the curve direction of the display surface 10DS and divides the pixels PX adjacent to each other in the orthogonal-to-curve direction extending along the display surface 10DS and orthogonal to the curve direction. Such a feature can block light traveling between the pixels PX adjacent to each other in the orthogonal-to-curve direction, making it possible to appropriately maintain levels of gray to be displayed by the pixels PX. Moreover, in producing the curved liquid crystal panel 10, even if the array substrate 10A and the counter substrate 10B are reshaped so that, for example, the display surface 10DS in a flat state is curved, the light shield 16 extending in the curve direction is kept from displacement in the curve direction in relation to the pixels PX when the array substrate 10A and the counter substrate 10B are reshaped.

Not all of the pixels PX function normally. An example of possible defects is a bright dot defect in which a pixel PX is always recognized bright. Such a bright dot defect is a cause of significant deterioration in display quality, and the bright dot defect can be repaired to appear dark. This repair involves processing the light shield 16 of the counter substrate 10B and dispersing the light-shielding material, contained in the light shield 16, into an area overlapping the pixel PX having the bright dot defect. It is difficult to carry out this repair while the display surface 10DS of the curved liquid crystal panel 10 is curved, and thus the repair is carried out when the display surface 10DS is flat. However, when the repair is done and the array substrate 10A and the counter substrate 10B are reshaped such that the display surface 10DS is curved, the area 16DA in which the light-shielding material is diffused by the repair could be displaced in the curve direction in relation to the pixel PX having the bright dot defect. This is because the light shield 16 to be processed by the repair extends in the curve direction and it is difficult for the worker to recognize the portion to be processed.

The counter substrate 10B is provided with the indicators 18 each serving as a position indicator of a pixel PX in the curve direction. Hence, processed in the repair may be a portion included in the light shield 16 along the curve and indicated by the indicator 18. As can be seen, when the repair is done and the array substrate 10A and the counter substrate 10B are reshaped such that the display surface 10DS is curved, the area 16DA, in which the light-shielding material is diffused by the repair, is positioned to overlap the pixel PX having the bright dot defect. Such a feature is less likely to cause a displacement of the area 16DA in the X-axis direction. Thanks to the feature, the bright dot defect can appear appropriately dark, and deterioration in display quality due to the bright dot defect is less likely to occur.

The indicator 18 includes the indicators 18 aligned at intervals in the curve direction, and arranged so that positional relationship of the indicators 18 with the pixels PX while the display surface 10DS is flat varies in accordance with a position of the counter substrate 10B in the curve direction. When the repair is done and the array substrate 10A and the counter substrate 10B are reshaped such that the display surface 10DS is curved, the amount of displacement of the area 16DA, in which the light-shielding material is diffused by the repair, in the curve direction in relation to the pixels PX varies depending on a position of the portion, included in the light-shield 16 and processed by the repair, in the curve direction. The indicators 18 aligned at intervals in the curve direction are arranged so that the positional relationship of the indicators 18 in relation to the pixels PX while the display surface 10DS is flat varies in accordance with the position of the counter substrate 10B in the curve direction. Hence, even if a pixel PX in any given position in the curve direction has a bright dot defect, such a feature makes it possible to process an appropriate portion of the light shield portion 16 in accordance with the indicators 18. When the repair is done and the array substrate 10A and the counter substrate 10B are reshaped, this feature allows the area 16DA, in which the light-shielding material is diffused by the repair, to be less likely to be displaced in the curve direction in relation to the pixel PX having the bright dot defect.

In the center portion BC of the counter substrate 10B in the curve direction, the indicators 18 are arranged so that the positional relationship of the indicators 18 with the pixels PX while the display surface 10DS is flat coincides with positional relationship of the indicators 18 with the pixels PX while the display surface 10DS is curved. The center portion 10BC of the array substrate 10A and the counter substrate 10B in the curve direction is rarely displaced relatively even if the array substrate 10A and the counter substrate 10B are reshaped so that the display surface 10DS in a flat state is curved. In contrast, among the indicators 18 aligned at intervals in the curve direction, an indicator 18 included in the center portion 10BC of the counter substrate 10B in the curve direction is disposed so that the positional relationship of the indicator 18 with a pixel PX while the display surface 10DS is flat coincides with the positional relationship of the indicator 18 with the pixel PX while the display surface 10DS is curved. Thanks to the feature, in the center portion 10BC of the array substrate 10A and the counter substrate 10B in the curve direction, the area 16DA in which the light-shielding material is diffused by the repair is more likely to overlap, in the curve direction, the pixel PX having the bright dot defect.

The curved display panel 10 further includes the seal 10D sandwiched between outer periphery ends of the array substrate 10A and the counter substrate 10B. In the end portion 10BE of the counter substrate 10B in the curve direction, the indicators 18 are arranged so that the positional relationship of the indicators 18 with the pixels PX while the display surface 10DS is flat coincides with positional relationship of the indicators 18 with the pixels PX while the display surface 10DS is curved. Because the outer peripheral ends of the array substrate 10A and the counter substrate 10B are sealed by the seal 10D, the array substrate 10A and the counter substrate 10B are rarely displaced relatively even if reshaped so that the display surface 10DS in the flat state is curved. In contrast, among the indicators 18 aligned at intervals in the curve direction, an indicator 18 included in the end portion 10BE of the counter substrate 10B in the curve direction is disposed so that the positional relationship of the indicator 18 in relation with a pixel PX while the display surface 10DS is flat coincides with the positional relationship of the indicator 18 in relation with the pixel PX while the display surface is curved. Thanks to the feature, in the end portion 10BE of the array substrate 10A and the counter substrate 10B in the curve direction, the area 16DA in which the light-shielding material is diffused by the repair is more likely to overlap, in the curve direction, the pixel PX having the bright dot defect.

In the intermediate portion 10BI of the counter substrate 10B in the curve direction between the center position and the end position, the indicators 18 are arranged so that the positional relationship of the indicators 18 with the pixels PX while the display surface 10DS is flat is different from positional relationship of the indicators 18 with the pixels PX while the display surface 10DS is curved. The intermediate portions 10BI of the array substrate 10A and the counter substrate 10B are relatively displaced when the array substrate 10A and the counter substrate 10B are reshaped so that the display surface 10DS in a flat state is curved. In contrast, among the indicators 18 aligned at intervals in the curve direction, an indicator 18 included in the intermediate portion 10BI of the counter substrate 10B in the curve direction is disposed so that the positional relationship of the indicator 18 with a pixel PX while the display surface 10DS is flat is different from the positional relationship of the indicator 18 with the pixel PX while the display surface 10DS is curved. Hence, even if the intermediate portions 10BI of the array substrate 10A and the counter substrate 10B in the curve direction are relatively displaced when the array substrate 10A and the counter substrate 10B are reshaped after the repair and the display surface 10DS is curved, in the intermediate portions 10BI of the array substrate 10A and the counter substrate 10B in the curve direction, the area 16DA in which the light-shielding material is diffused by the repair is more likely to overlap, in the curve direction, a pixel PX having a bright dot defect.

The indicators 18 are arranged so that, in the intermediate portion 10BI of the counter substrate 10B, a difference between positions of the indicators 18 in relation to the pixels PX in the curve direction while the display surface 10DS is flat and positions of the indicators 18 in relation to the pixels PX in the curve direction while the display surface 10DS is curved becomes smaller toward the center position in the curve direction. The intermediate portions 10BI of the array substrate 10A and the counter substrate 10B are relatively displaced when the array substrate 10A and the counter substrate 10B are reshaped so that the display surface 10DS in the flat state is curved. The amount of the relative displacement tends to be smaller toward the center position in the curve direction. In contrast, among the indicators 18 aligned at intervals in the curve direction, an indicator 18 included in the intermediate portion 10BI of the counter substrate 10B in the curve direction is disposed so that a difference between a position of the indicator 18 in relation to a pixel PX in the curve direction while the display surface 10DS is flat and a position of the indicator 18 in relation to the pixel PX in the curve direction while the display surface 10DS is curved becomes smaller toward the center position in the curve direction. Hence, even if the intermediate portions 10BI of the array substrate 10A and the counter substrate 10B in the curve direction are relatively displaced, and the amount of the relative displacement becomes smaller toward the center portion in the curve direction when the array substrate 10A and the counter substrate 10B are reshaped after the repair and the display surface 10DS is curved, in the intermediate portions 10BI of the array substrate 10A and the counter substrate 10B in the curve direction, the area 16DA in which the light-shielding material is diffused by the repair is more likely to overlap, in the curve direction, a pixel PX having a bright dot defect.

The indicator 18 is integrally provided to the light shield 16, and protrudes from the light shield 16 in the orthogonal-to-curve direction. In processing the light shield 16 integrally provided to the indicator 18, such a feature makes it possible to appropriately process a portion of the light shield 16 in accordance with the indicator 18.

The indicator 18 is provided to protrude in the orthogonal-to-curve direction from opposing sides of the light shield 16. In processing the light shield 16, such a feature allows the indicator 18 to be readily recognized, making it possible to process more appropriately a portion of the light shield 16 in accordance with the indicator 18.

The indicator 18 includes the indicators 18 aligned at intervals in the curve direction, and individually provided to the pixels PX aligned in the curve direction. Compared with a case where one indicator 18 is provided for each of the pixels PX, such a feature makes it possible in processing the light shield 16 to appropriately process a portion, of the light shield 16, based on the indicator 18.

Each of the pixels PX includes: the pixel electrodes 12 provided to the array substrate 10A and arranged in a matrix inside the display surface 10DS; and the color filters 15 provided to the array substrate 10A and arranged to overlap the pixel electrodes 12, The color filters adjacent to each other in the curve direction have different colors, and the color filters adjacent to each other in the orthogonal-to-curve direction have the same color. Thanks to such features, the pixels PX, each including the color filters 15 and the pixel electrodes 12 overlapping the color filters 15, display an image on the display surface 10DS. The pixel electrodes 12 and the color filters 15 included in the pixels PX are both provided to the array substrate 10A. Hence, even if the array substrate 10A and the counter substrate 10B are reshaped so that the display surface 10DS in a flat state is curved, the features make it possible to keep pixel electrodes 12 and the color filters 15 from relative displacement in the curve direction. Consequently, the features provide appropriate levels of gray for the colors presented with the color filters 15 of the pixels PX adjacent to each other in the curve direction.

Second Embodiment

Figure 19:
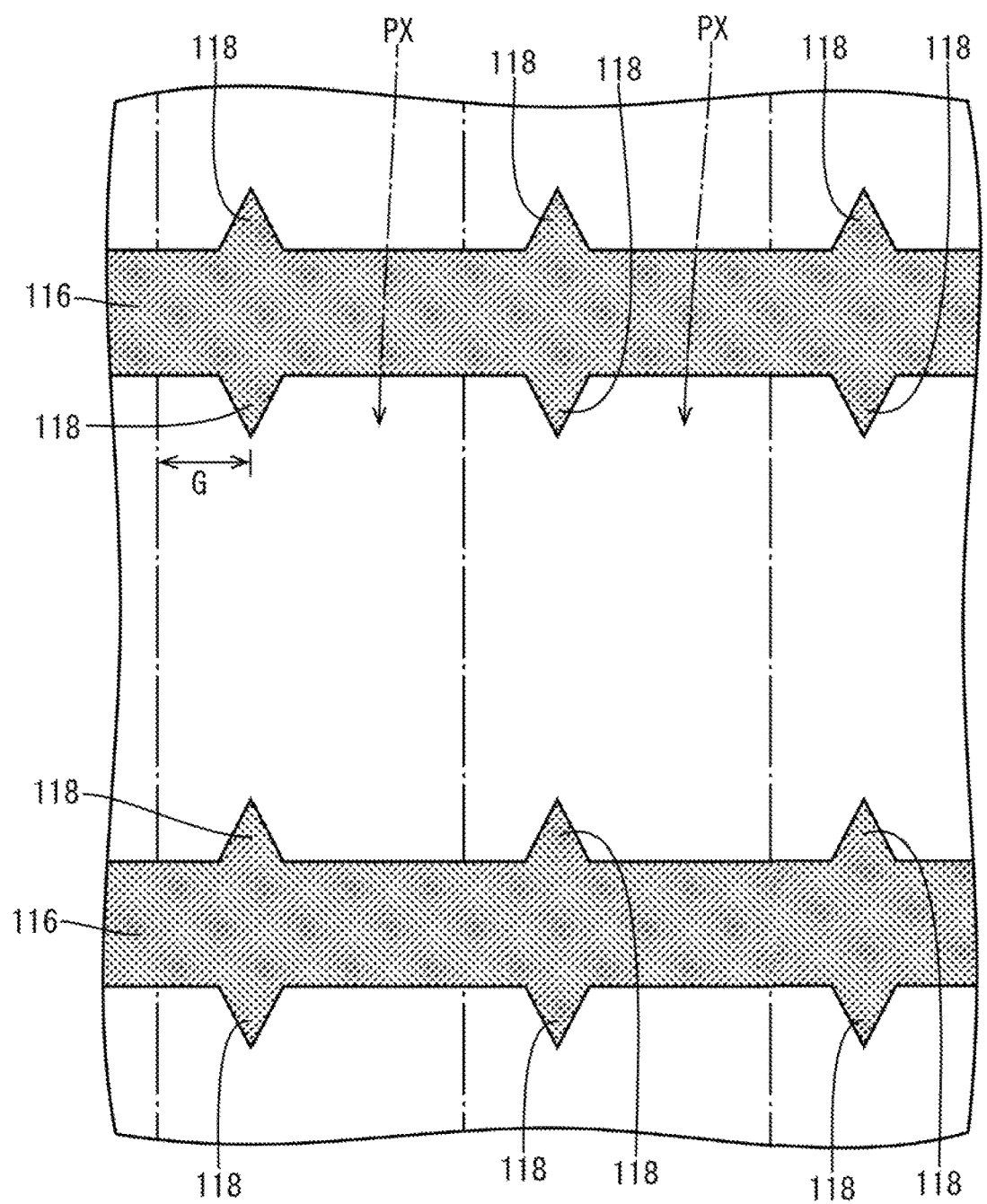
FIG. 19 is a plan view of light shields and indicators included in an intermediate portion of a counter substrate included in a flat liquid crystal panel according to a second embodiment, the indicators being positioned where an absolute value of a conceivable displacement for each pixel is largest.

A second embodiment is described, with reference to FIG. 19. The second embodiment shows indicators 118 modified in configuration. Note that identical or corresponding structures and advantageous effects between this embodiment and the first embodiment will not be elaborated upon.

As illustrated in FIG. 19, each of the indicators 118 according to this embodiment has a triangular planar shape. Each indicator 118 shaped into a triangle has a base integrally provided to a light shield 116 and a pair of oblique sides extending toward pixels PX in the Y-axis direction. The vertex at which the pair of the oblique sides meets mainly functions as a position indicator of a pixel PX in the X-axis direction. FIG. 19 illustrates an example of the indicators 118 arranged in an intermediate portion 110BI of a counter substrate. Hence, each of the indicators 118 illustrated as an example in FIG. 19 has the vertex positioned at clearance G for a conceivable displacement of each pixel PX from a longitudinal side of an outline of the pixel PX. The indicators 118 of this embodiment can achieve similar advantageous effects as those of the above first embodiment.

Third Embodiment

Figure 20:
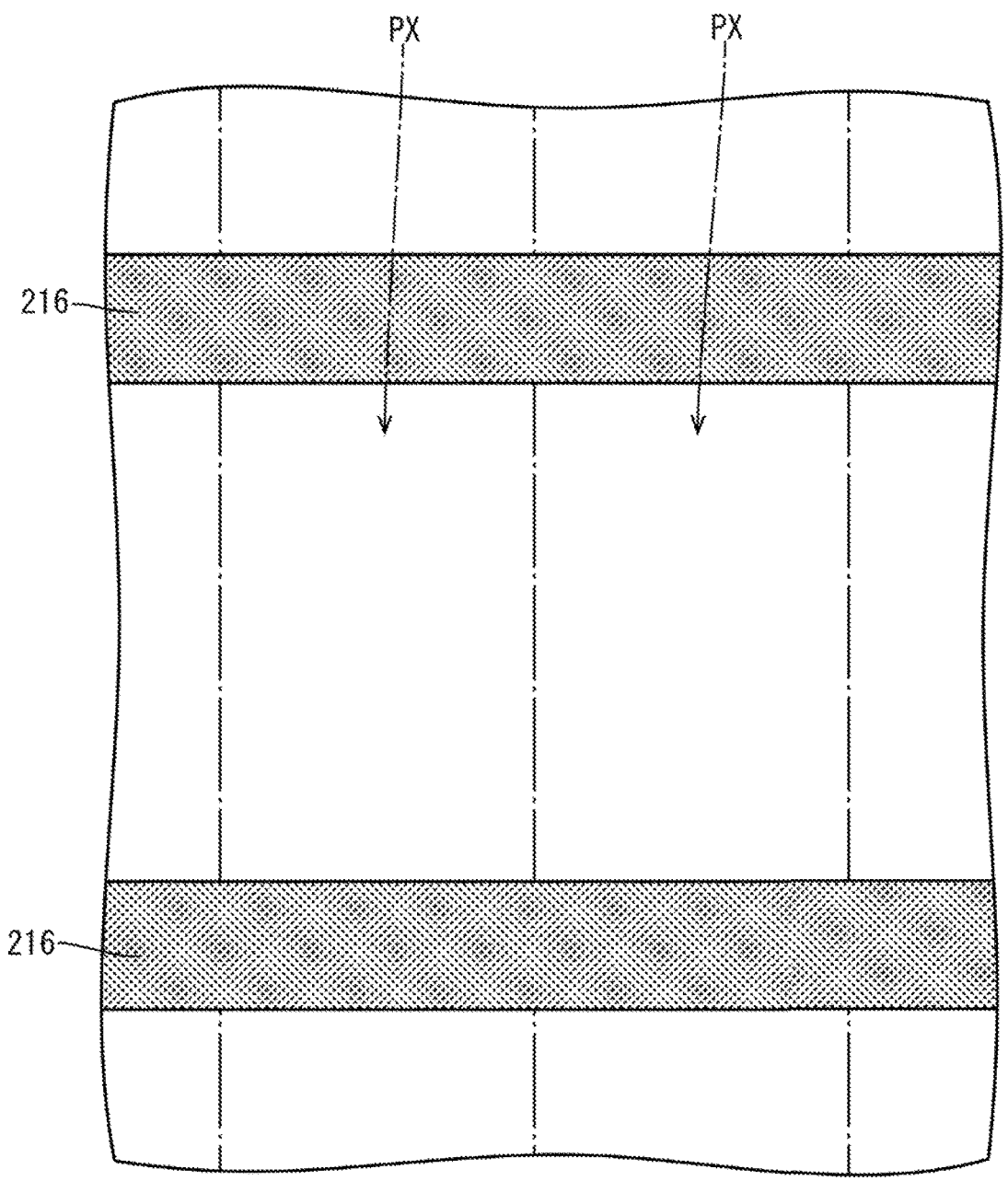
FIG. 20 is a plan view illustrating light shields and indicators included in a center portion of a counter substrate included in a flat liquid crystal panel according to a third embodiment.

A third embodiment is described, with reference to FIG. 20. This third embodiment is the first embodiment whose indicators are partially removed. Note that identical or corresponding structures and advantageous effects between this embodiment and the first embodiment will not be elaborated upon.

In this embodiment, as illustrated in FIG. 20, the indicators are omitted from a center portion 210BC of a counter substrate. Likewise, the indicators are omitted also from opposing end portions of the counter substrate. That is, in this embodiment, the indicators are selectively provided only to an intermediate portion of the counter substrate (see FIGS. 8 and 9). In the center portion 210BC and the opposing end portions, conceivable displacements of pixels PX are substantially 0 µm. Such a feature makes it possible to appropriately process a specific portion of a light shield 216 in accordance only with position information on a bright dot defect without the indicators. Even if selectively arranged as seen in this embodiment, the indicators can achieve advantageous effects similar to those of the above first embodiment.

Fourth Embodiment

Figure 21:
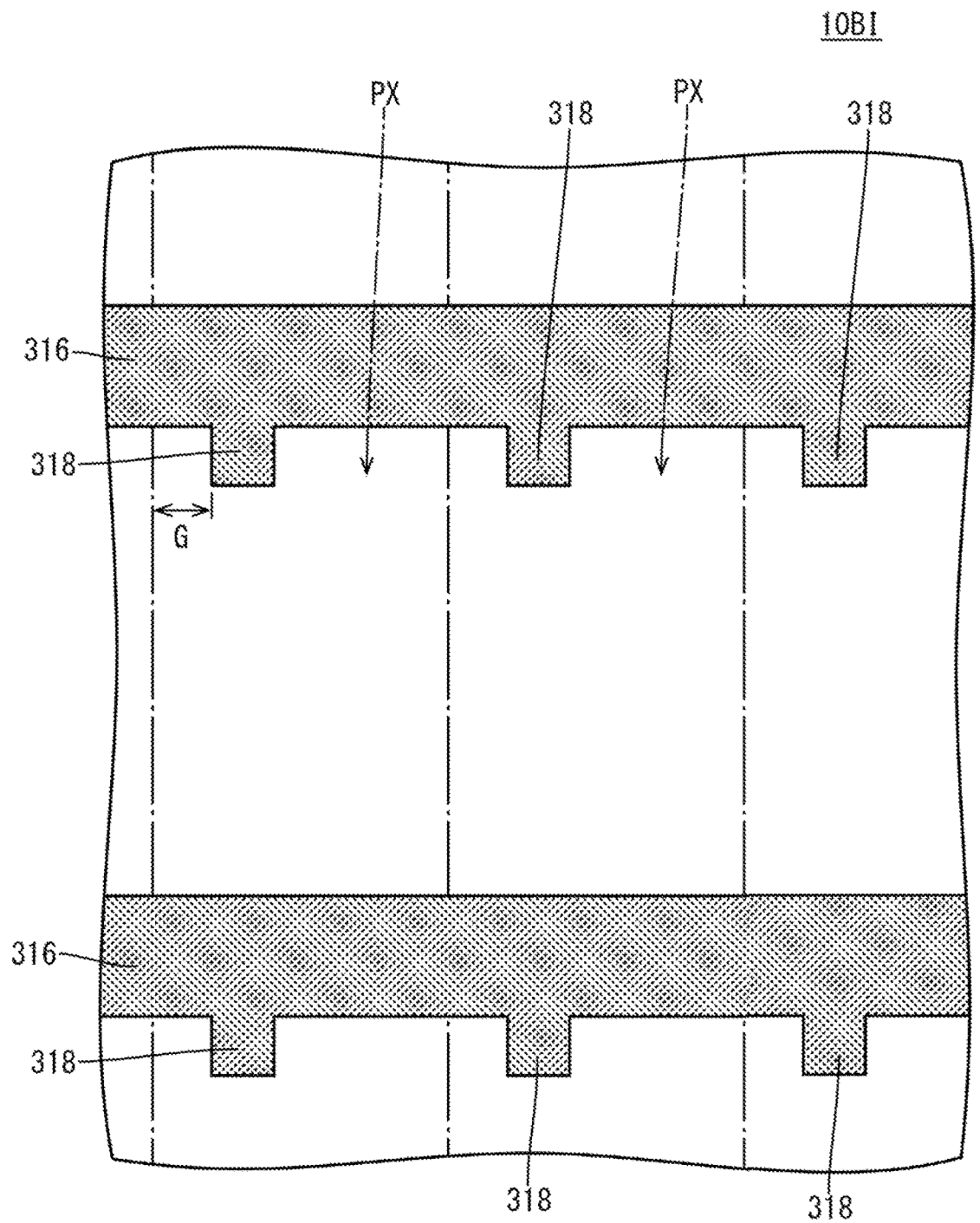
FIG. 21 is a plan view of light shields and indicators included in an intermediate portion of a counter substrate included in a flat liquid crystal panel according to a fourth embodiment, the indicators being positioned where an absolute value of a conceivable displacement for each pixel is largest.

A fourth embodiment is described, with reference to FIG. 21. The fourth embodiment shows indicators 318 modified in configuration from the indicators of the above first embodiment. Note that identical or corresponding structures and advantageous effects between this embodiment and the first embodiment will not be elaborated upon.

As illustrated in FIG. 21, each of the indicators 318 according to this embodiment is provided to a light shield 316 extending in the X-axis direction. The indicator 318 protrudes only in one direction along the Y-axis. The indicators 318 of this embodiment can achieve similar advantageous effects as those of the above first embodiment.

Other Embodiments

The techniques disclosed in this specification shall not be limited to the embodiments described above or the drawings of the embodiments.

(1) In the first embodiment, the right side of each indicator 18 illustrated in FIGS. 6 to 9 may mainly function as a position indicator of a pixel PX in the X-axis direction. The same applies to the third and fourth embodiments.

(2) In the second embodiment, a portion of each indicator 118 other than the vertex (e.g., a position in which an oblique side of the indicator 118 coincides with a light shield 116) may mainly function as position indicator of a pixel PX in the X-axis direction.

(3) The indicators 18, 118, and 318 may be arranged to indicate the center positions of the pixels PX in the X-axis direction, other than the end positions of the pixels PX in the X-axis direction.

(4) The indicators 18, 118, and 318 may be appropriately modified to have any specific planar shape other than a quadrangle or a triangle. For example, the indicators 18, 118, and 318 may have a planar shape of a trapezoid, a semi-circle, and a semi-ellipse.

(5) The indicators 18, 118, and 318 do not have to be integrally provided to the light shields 16, 116, 216, and 316, and may be separated (spaced apart) from the light shields 16, 116, 216, and 316.

(6) One indicator 18, 118, or 318 may be provided to each group of the pixels PX.

(7) The indicators 18, 118, and 318 do not have to be made of the same light-shielding material as that of the light shields 16, 116, 216, and 316, and may be made of a material different from that of the light shields 16, 116, 216, and 316.

(8) The common electrode 14 may be omitted and replaced with the counter substrate 10B as an alternative. In such a case, the display mode of the curved liquid crystal panel 10 is a TN mode and a VA mode.

(9) The curved liquid crystal panel 10 may curve to have a longitudinal center portion curving out toward the font, and transversely opposing ends curving in toward the back.

(10) The curved liquid crystal panel 10 may curve so that the curve axis CAX coincides with the longitudinal direction of the curved liquid crystal panel 10. In such a case, the curve direction coincides with the transverse direction of the curved liquid crystal panel 10, and the orthogonal-to-curve direction coincides with the longitudinal direction of the curved liquid crystal panel 10.

(11) The color filters 15 in different colors may be arranged in the same direction as the orthogonal-to-curve direction of the curved liquid crystal panel 10. The color filters 15 in the same color may arranged in the same direction as the curve direction of the curved liquid crystal panel 10.

(12) The curved liquid crystal panel 10 does not have to include the color filters 15.

(13) The curved liquid crystal panel 10 may have other shapes than a rectangular, such as, for example, a square, a circle, and an ellipse.

(14) The curved liquid crystal panel 10 may include other switching elements than the TFTs 11, such as, for example, thin-film diodes (TFDs).

(15) The curved liquid crystal panel 10 may have functional organic molecules other than a liquid crystal material held between a pair of the substrates 10A and 10B.

(16) The disclosure may be applicable to other kinds of curved display panels than the curved liquid crystal panel 10, such as curved organic EL display panels, curved electrophoretic display (EPD) panels, and curved micro-electro-mechanical-systems (MEMS) display panels.

While there have been described what are at present considered to be certain embodiments of the application, it will be understood that various modifications may be made thereto, and it is intended that the appended claim cover all such modifications as fall within the true spirit and scope of the application.

What is claimed is:

1. A curved display panel including a display surface curving at least around a curve axis and displaying an image, the curved display panel comprising:
    a first substrate;
    a second substrate spaced apart from, and facing, the first substrate;
    a plurality of pixels provided to the first substrate, and arranged in a matrix inside the display surface;
    a light shield provided to the second substrate, extending in a curve direction of the display surface, and dividing the pixels adjacent to each other in an orthogonal-to-curve direction extending along the display surface and orthogonal to the curve direction; and
    an indicator provided to the second substrate, and serving as a position indicator of each of the pixels in the curve direction, wherein
    the indicator includes a plurality of indicators aligned at intervals in the curve direction, and arranged so that positional relationship of the indicators with the pixels while the display surface is flat varies in accordance with a position of the second substrate, the plurality of indicators including intermediate indicators, end indicators, and center indicators, and
    the second substrate includes:
        an end portion forming an edge of the second substrate in the curve direction,
        a center portion in the curve direction, and
        an intermediate portion positioned between the center portion and the end portion in the curve direction, and
    the intermediate indicators are provided at the intermediate portion, each of the intermediate indicators being respectively spaced by a clearance away from an outline of corresponding one of the plurality of pixels in a plan view,
    the end indicators are provided at the end portion, and the center indicators are provided at the center portion, each of the end indicators and the center indicators being respectively overlapped with an outline of corresponding one of the plurality of pixels in the plan view, and
    the plurality of indicators is integrally provided to the light shield, and protrudes from the light shield in the orthogonal-to-curve direction.

2. The curved display panel according to claim 1, wherein in the center portion of the second substrate in the curve direction, the indicators are arranged so that the positional relationship of the indicators with the pixels while the display surface is flat coincides with positional relationship of the indicators with the pixels while the display surface is curved.

3. The curved display panel according to claim 1, further comprising
    a seal sandwiched between outer periphery ends of the first substrate and the second substrate, wherein
    in the end portion of the second substrate in the curve direction, the indicators are arranged so that the positional relationship of the indicators with the pixels while the display surface is flat coincides with positional relationship of the indicators with the pixels while the display surface is curved.

4. The curved display panel according to claim 1, wherein in the intermediate portion of the second substrate in the curve direction between a center position and an end position, the indicators are arranged so that the positional relationship of the indicators with the pixels while the display surface is flat is different from positional relationship of the indicators with the pixels while the display surface is curved.

5. The curved display panel according to claim 4, wherein the indicators are arranged so that, in the intermediate portion of the second substrate, a difference between positions of the indicators in relation to the pixels in the curve direction while the display surface is flat and positions of the indicators in relation to the pixels in the curve direction while the display surface is curved becomes smaller toward the center position in the curve direction.

6. The curved display panel according to claim 1, wherein the indicator is provided to protrude in the orthogonal-to-curve direction from opposing sides of the light shield.

7. The curved display panel according to claim 1, wherein the indicator includes the plurality of indicators individually provided to the pixels aligned in the curve direction.

8. The curved display panel according to claim 1, wherein each of the pixels includes: a plurality of pixel electrodes provided to the first substrate and arranged in a matrix inside the display surface; and a plurality of color filters provided to the first substrate and arranged to overlap the pixel electrodes, the color filters adjacent to each other in the curve direction having different colors, and the color filters adjacent to each other in the orthogonal-to-curve direction having the same color.

* * * * *